(12) United States Patent
Eagan et al.

(10) Patent No.: US 11,333,392 B1
(45) Date of Patent: May 17, 2022

(54) WALL VENT DOOR ASSEMBLY

(71) Applicant: Eagan Manufacturing Company, Inc., Blackrock, AR (US)

(72) Inventors: Richard Kevin Eagan, Blackrock, AR (US); Cliff Hufstedler, Warm Springs, AR (US); Christian Andre Sudbeck, Barnstorf (DE)

(73) Assignee: Eagan Manufacturing, Inc., Black Rock, AR (US)

( * ) Notice: Subject to any disclaimer, the term of this patent is extended or adjusted under 35 U.S.C. 154(b) by 0 days.

(21) Appl. No.: 17/318,449

(22) Filed: May 12, 2021

Related U.S. Application Data

(60) Provisional application No. 63/044,444, filed on Jun. 26, 2020.

(51) Int. Cl.
| | | |
|---|---|---|
| *E05D 1/00* | (2006.01) | |
| *F24F 13/14* | (2006.01) | |
| *E05D 7/00* | (2006.01) | |
| *E05D 1/02* | (2006.01) | |
| *E06B 1/26* | (2006.01) | |
| *E06B 1/12* | (2006.01) | |

(52) U.S. Cl.
CPC ............ *F24F 13/1486* (2013.01); *E05D 1/02* (2013.01); *E05D 7/009* (2013.01); *E06B 1/12* (2013.01); *E06B 1/26* (2013.01)

(58) Field of Classification Search
CPC ... Y10T 16/525; Y10T 16/54; Y10T 16/5253; Y10T 16/548; E05D 1/00; E05D 1/02; E05D 9/005; E05D 7/00; E05D 7/009; B29L 2031/22; B29C 51/00; B29C 65/70; B29C 65/30; B29C 66/71; B29C 66/712; B29K 2105/06; B29K 2105/089; F16C 11/12; E09Y 2900/602; F24F 13/1486; F24F 13/1493; F24F 13/18; E06B 1/12; E06B 1/26

See application file for complete search history.

(56) References Cited

U.S. PATENT DOCUMENTS 2,241,101 A * 5/1941 Teeter .................. F25D 23/026
160/231.2
2,526,129 A * 10/1950 Groesbeck ................ E05D 1/02
16/225

(Continued)

FOREIGN PATENT DOCUMENTS

GB 2113749 A * 8/1983 ............... E06B 9/15

*Primary Examiner* — Chucky Y Mah
(74) *Attorney, Agent, or Firm* — Joe D. Calhoun

(57) ABSTRACT

A wall vent door assembly including a multi-functional hinge including flexible and resilient material extending continuously along the hinge edge of the door; one edge of the door is configured to accept and/or otherwise interface with a complimentary edge of the hinge material, and the adjacent hinge edge of the mounting frame is configured to accept and/or otherwise interface with another complimentary edge of the hinge material. Besides providing the hinge connection between the door and the adjacent frame, the flexible material also seals the interface to prevent entry of light and wind when the door is closed. The flexible and resilient hinge material also acts as a spring, exerting force to assist in the movement of the door from the closed position to open positions.

25 Claims, 23 Drawing Sheets

(56) References Cited

U.S. PATENT DOCUMENTS

| | | | | | |
|---|---|---|---|---|---|
| 2,607,411 | A | * | 8/1952 | Van Vliet | E05D 1/02 |
| | | | | | 160/231.2 |
| 3,116,678 | A | * | 1/1964 | Hierta | B60H 1/3407 |
| | | | | | 454/143 |
| 3,441,975 | A | * | 5/1969 | Shepherd | E05D 1/02 |
| | | | | | 16/225 |
| 5,133,108 | A | * | 7/1992 | Esnault | E05D 15/242 |
| | | | | | 16/225 |
| 5,148,850 | A | * | 9/1992 | Urbanick | E05D 15/242 |
| | | | | | 16/225 |
| 5,520,580 | A | * | 5/1996 | Showalter | A01K 1/0064 |
| | | | | | 454/273 |
| 5,613,541 | A | * | 3/1997 | Bradbury | B60J 5/14 |
| | | | | | 160/231.2 |
| 6,178,763 | B1 | * | 1/2001 | Brancheau | F25D 21/04 |
| | | | | | 219/536 |
| 6,378,172 | B1 | * | 4/2002 | Schrage | E05D 3/12 |
| | | | | | 16/225 |
| 7,111,660 | B2 | * | 9/2006 | Hartmann | B60J 5/14 |
| | | | | | 160/201 |
| 9,157,652 | B2 | * | 10/2015 | Chamness | F24F 11/75 |
| 9,249,983 | B2 | * | 2/2016 | Pagenstert | F24F 13/14 |
| 10,433,521 | B2 | * | 10/2019 | Hoolboom | A01K 1/0064 |
| 2005/0076576 | A1 | * | 4/2005 | Rijn | B60J 5/0491 |
| | | | | | 49/504 |
| 2009/0233538 | A1 | * | 9/2009 | Brown | F24F 5/0075 |
| | | | | | 454/271 |
| 2012/0186754 | A1 | * | 7/2012 | Klem | B29C 51/267 |
| | | | | | 160/236 |

* cited by examiner

WALL VENT DOOR ASSEMBLY

CROSS REFERENCE TO RELATED APPLICATIONS

This utility patent application is a continuation of, and claims the benefit of the filing date of, provisional application No. 63/044,444 filed 24 Jun. 2020, which is incorporated herein.

FEDERALLY SPONSORED RESEARCH AND DEVELOPMENT

Not applicable.

MICROFICHE APPENDIX

Not applicable.

BACKGROUND OF THE INVENTION

(1) Field of the Invention

The present invention relates to ventilation openings. More particularly, the invention disclosed herein relates to wall vents, especially in poultry houses.

(2) Background of the Invention

Wall vent door assemblies for venting structures such as poultry houses are known in the prior art. Such known assemblies typically include standard sealing of the vent opening when the door is closed, along the sides other than the hinged side. Prior art wall vent door assemblies also may include a system of cords extending from each door to the poultry house wall and/or to a control bar extending the length of the wall, which can be moved longitudinally (along its axis) to shorten or lengthen the cord(s) for governing the amount the door(s) is/are open or closed; however, those cord systems are stationary (in one position), and incapable of adjustment or difficult to install in retrofit situations.

U.S. Pat. No. 3,838,392 issued to Pagenstert (entitled Air Supply Shutter for Livestock Buildings) discloses a shutter flap (vent door) pivotally mounted on the frame for rotation about a generally horizontal axis between closed and open positions. A coupler is connected with the shutter flap and configured for engagement with an activator for shifting the shutter flap between the closed and open positions. The upper frame member includes an air guiding wall which is disposed on the outlet side of the air vent opening, faces the air vent opening, and extends upwardly at a predetermined angle to deflect the air flowing through the air vent opening. This patent does not disclose the flexible hinge or door-closure mechanism of the present invention.

U.S. Pat. No. 5,987,836 issued to Sullivan (entitled Louver Assembly and Method for Installing a Louver Assembly) discloses an apparatus and method of mounting a fixed vent-screen in a wall. This patent does not disclose the flexible hinge or door-closure mechanism of the present invention.

U.S. Pat. No. 5,520,580 issued to Showalter (entitled Air Handler to Control Air Supply in Confinement Buildings for Poultry And Livestock) discloses a curved baffle/door having a lowermost edge bent back to form a curved flange 38 with a rounded edge that, in the closed position, sits (and freely pivots) within the respective "valley" 30 of a pair of open bearings 28 having an "S" shape (rotated on its side). One end of each rotated-S open bearing terminates in a downward hook raised above its valley, whereas the intermediate portion of each S-shaped bearing forms a camming surface adjacent the concave surface of an intermediate portion of the baffle/door, and thereafter provides a fulcrum point also raised above its valley; the center of gravity of the baffle/door biases it in a fully open position, with an intermediate portion of the concave surface of the baffle/door resting on said fulcrum point of the S-shaped open bearing, and with the rounded edge of the baffle/door caught by said hooks of the open bearings. The main purpose of this hinge-less door-pivoting arrangement is to allow airflow beneath the bottom rounded edge of the open baffle/door, with the baffle-door curvature directing airflow downward. This arrangement does not support the expansion capabilities of the present invention, nor the light blocking and airflow blocking capabilities of the present invention.

None of the aforementioned patents expressly discloses a vent door assembly including:

(a) a hinge comprising a flexible and resilient material forming two opposite edges each configured to be captured within a respective hinge-edge channel extending continuously along the hinge-edge of the mounting frame and the door, the flexible hinge material exerting force assisting in door opening and also sealing the interface from entry of light and wind when the door is closed; and (b) an improved door-closure mechanism comprising a retainer screw assembly slidable within a horizontal track extending the width of the door, the screw having a split along its longitudinal axis to its free end through which a cord is run until its length allows the desired amount of door closure, a cap then being screwed over the free end of the retainer screw to clamp the cord in place at the desired position along the track.

SUMMARY OF THE INVENTION

In general, the invention disclosed herein includes (comprises) a door assembly for mounting into a space in the wall of a structure to be vented, such as a poultry house. The door assembly is essentially a square or rectangular frame supporting a hinge connection along one side, for a door pivotable between a fully closed configuration and a fully open configuration. Poultry houses typically have vent doors hinged along their bottom edge, with the doors opening to the interior of the structure. However, the invention disclosed herein may be used in contexts wherein the doors are hinged on other edges.

One novel and non-obvious feature of the vent door assembly described herein is a hinge comprising a flexible and resilient material extending continuously along the hinge edge of the door; one edge of the door is configured to accept and/or otherwise interface with a complimentary edge of the hinge material, and the adjacent hinge edge of the mounting frame is configured to accept and/or otherwise interface with another complimentary edge of the hinge material. Besides providing the hinge connection between the door and the adjacent frame, the flexible material also seals the interface to prevent entry of light and wind when the door is closed. The flexible and resilient hinge material also acts as a spring, exerting force to assist in the movement of the door from the closed position to open positions.

Another novel and non-obvious feature of the vent door assembly involves the governing means for governing the extent of closure of the vent door. Some prior vent door assemblies are known to have a cord that may be tied off or otherwise retained in a particular length, spanning from an edge of the door opposite the hinge to the nearby frame, thereby governing the extent of closure; the vent door assembly described herein has a track extending between both sides that are perpendicular to the hinge edge, and a retainer screw assembly configured to travel within that track until it is in the desired position to be simultaneously anchored in position and set the length of the cord preventing further opening of the door.

Other features of the vent door assembly facilitate the ease of mounting the assembly in the wall opening, typically mounted to the interior of the structure and extending outward to the exterior. The exterior of the frame includes an outstanding shelf or ledge that abuts the edge of the wall opening when the frame is in the correct position. Additionally, the perimeter of the frame includes a flange several inches wide, allowing the frame to be mounted in wall openings substantially larger than just the doorway portion of the assembly; the perimeter flange also allows the assembly to be mounted in wall openings that are slightly irregular in shape.

Another feature includes extension elements, allowing the door to be used in a frame assembly to be mounted in wall openings much taller than the door. For example, extension elements two inches tall may be stacked one atop the other, filling the gap between the bottom of the door and the flexible hinge seal needed to fully fill the wall space. Each extension element includes one longitudinal hinge edge configured to accept and/or otherwise interface with the hinge pocket of the door, and an opposite lower longitudinal edge configured to mimic the hinge pocket of the door so that it may accept and/or otherwise interface with either the flexible hinge seal or the upper hinge edge of another extension element having the same complimentary edges.

One primary objective of the disclosed invention is to provide a vent door assembly having a multifunctional hinge system providing door pivoting, total sealing against light and wind when closed, and assistance in opening the door and maintaining its open position.

Another objective of the disclosed invention is to provide a vent door assembly having a door opening governor that may be positioned to suit the needs of the user.

Another objective of the disclosed invention is to provide a vent door assembly capable of mounting in wall openings having a wide variety of dimensions.

Another objective of the disclosed invention is to provide a vent door assembly that is more readily installed with stability and correct positioning.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages herein provided will become apparent to one with skill in the art upon examination of the accompanying Figures and detailed description. It is intended that all such additional systems, methods, features and advantages that are included within this description, be within the scope of any claims filed now or later.

BRIEF DESCRIPTION OF THE DRAWINGS

The novel features believed characteristic of the disclosed subject matter will be set forth in the claims. The disclosed subject matter itself, however, as well as a preferred mode of use, further objectives, and advantages thereof, will best be understood by reference to the following detailed description of an illustrative embodiment when read in conjunction with the accompanying drawings.

Figure 1:
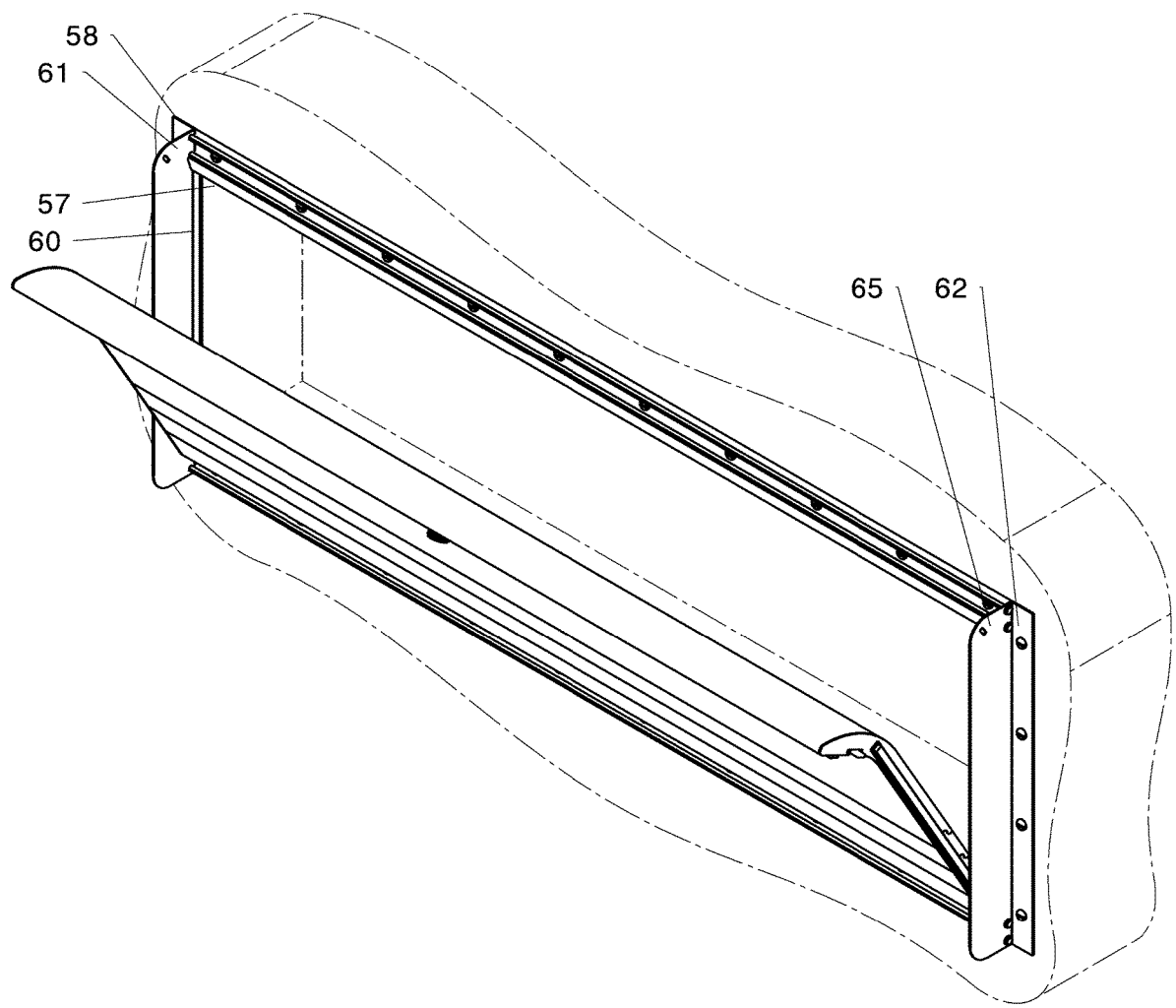
FIG. 1 is a right side perspective view (from the interior of the vented structure) of a representative sample of the wall vent door assembly embodying the present invention, in a fully open configuration (with the unclaimed wall in dashed lines, and with the closure-governing cord omitted).
Figure 2:
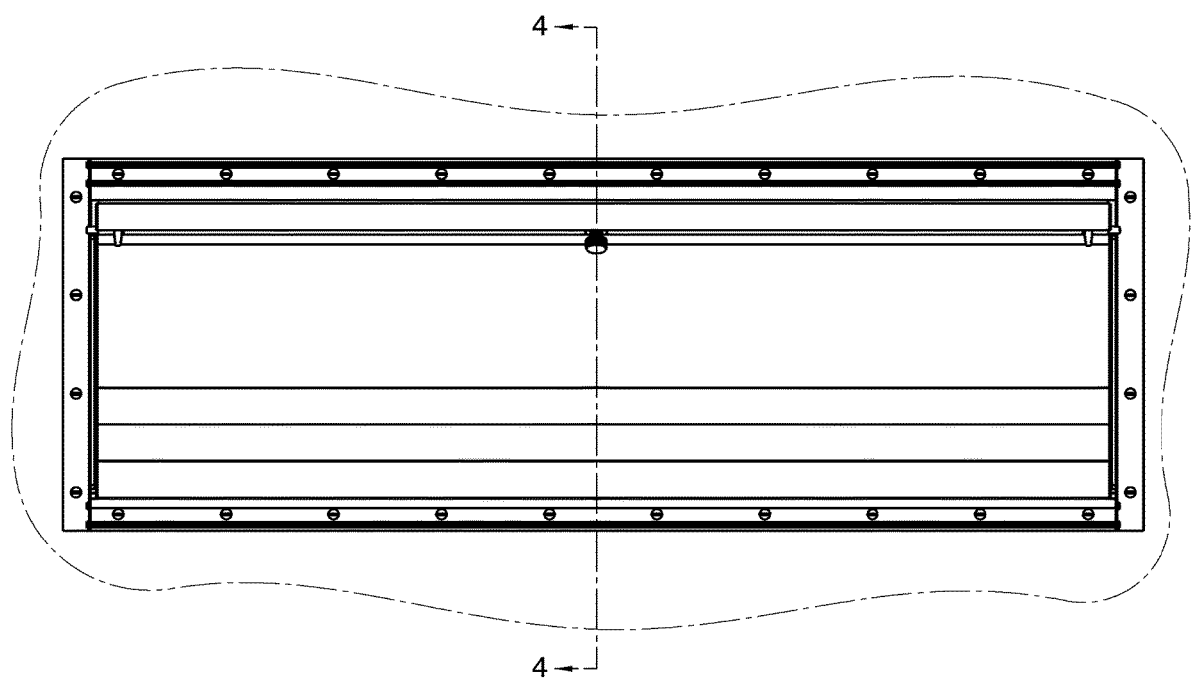
FIG. 2 is an interior front elevation view of the wall vent door assembly of FIG. 1.
Figure 3:
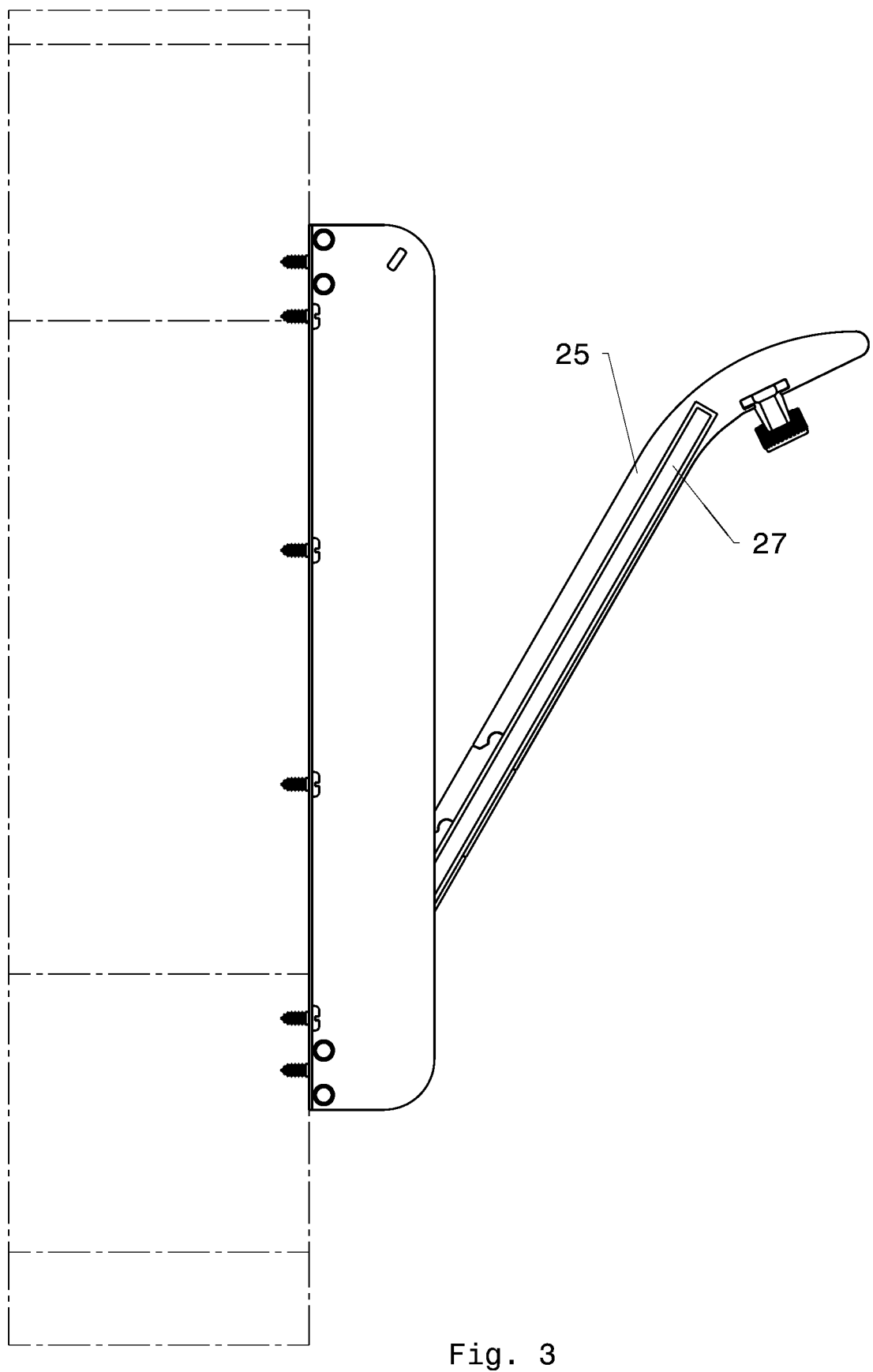
FIG. 3 is a left side elevation view of the wall vent door assembly of FIG. 1.
Figure 4:
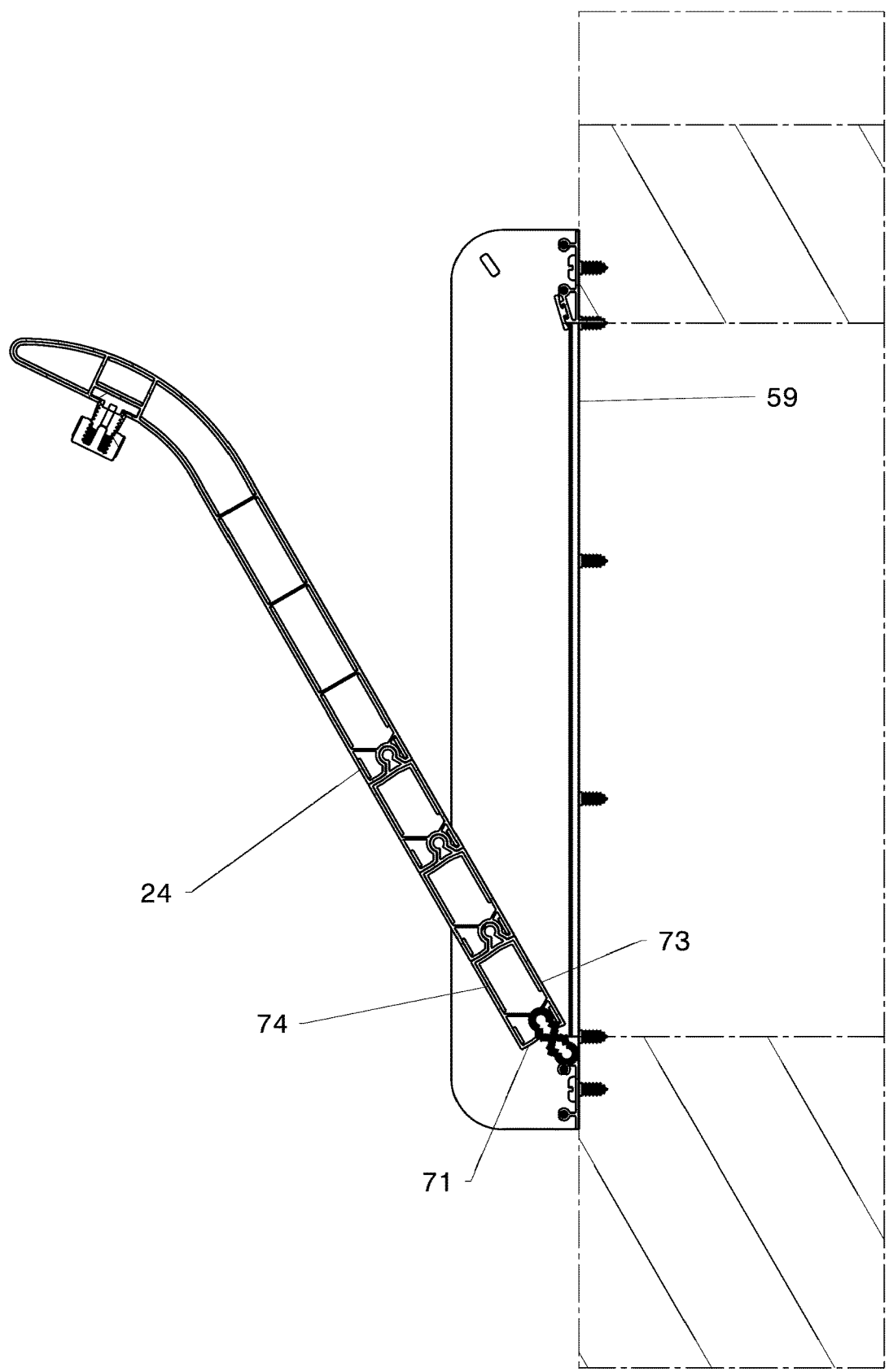
FIG. 4 is a cross-section view of the wall vent door assembly of FIG. 1, at plane 4-4 of FIG. 2.
Figure 5:
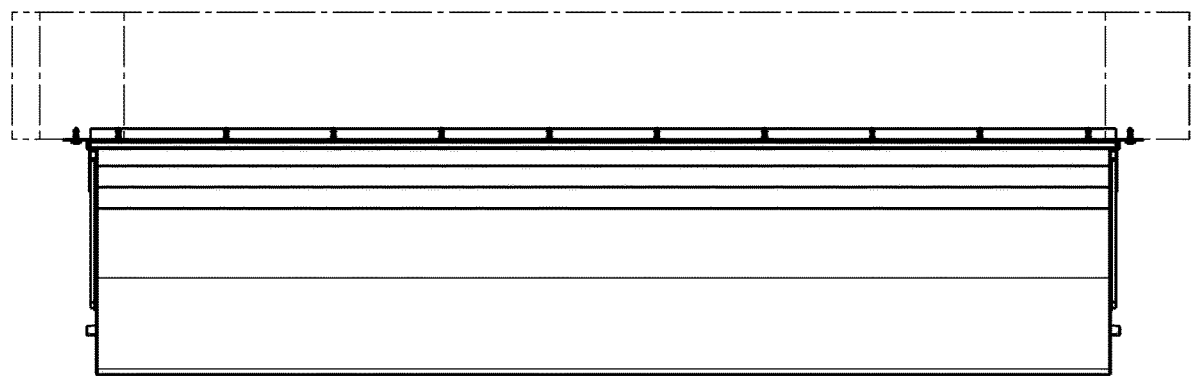
FIG. 5 is a top plan view of the wall vent door assembly of FIG. 1.
Figure 6:
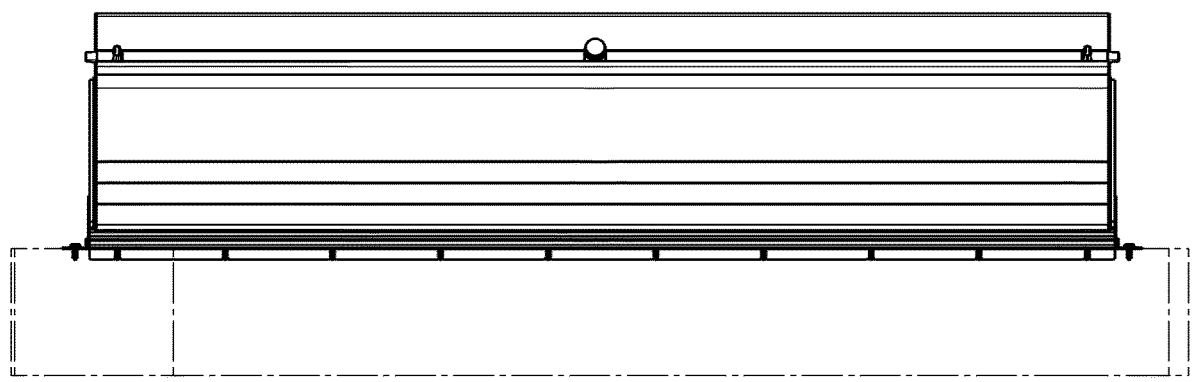
FIG. 6 is a bottom plan view of the wall vent door assembly of FIG. 1.
Figure 7:
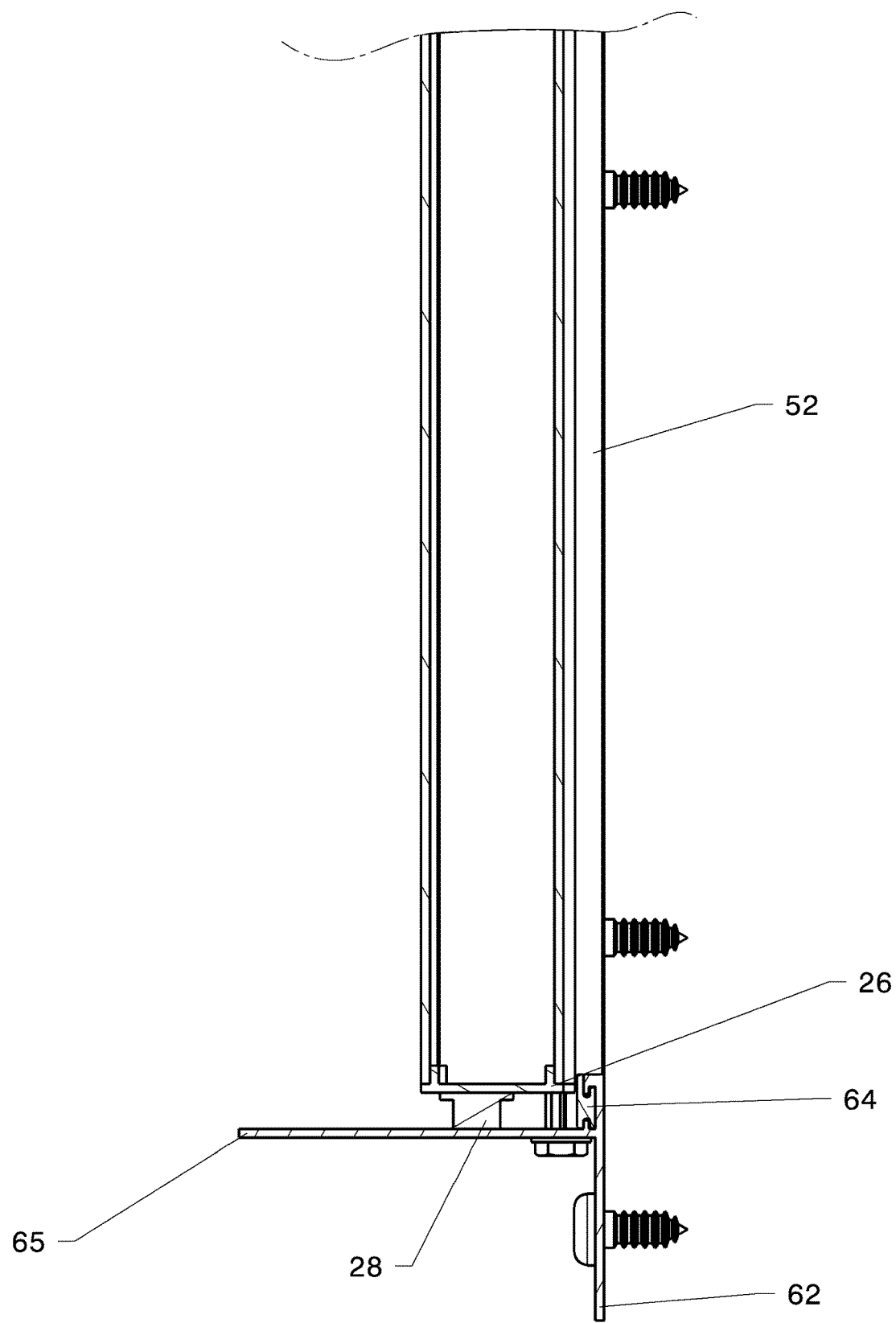
FIG. 7 is a cross-section view looking down from plane 7-7 of FIG. 12.
Figure 8:
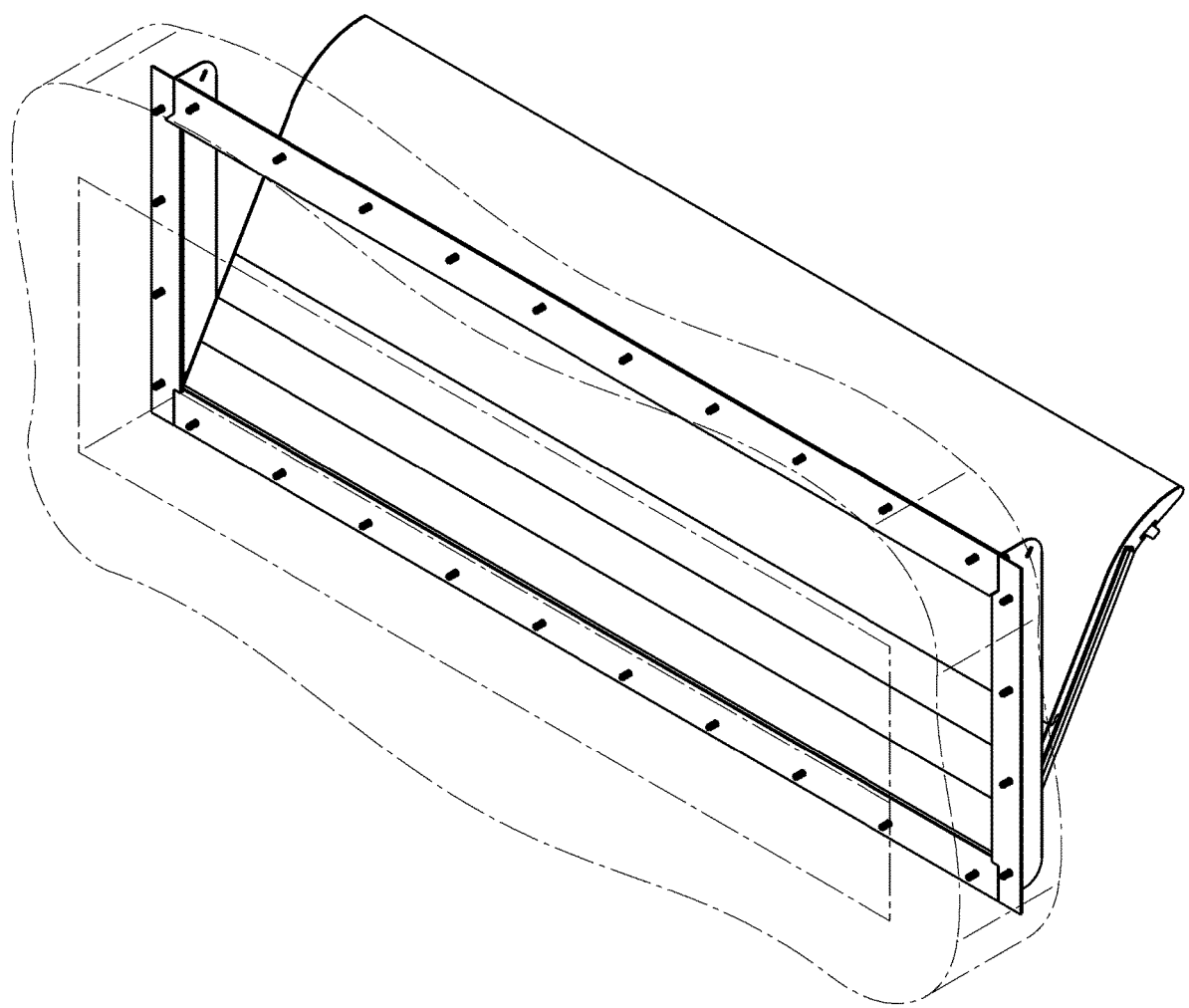
FIG. 8 is a perspective view of the wall vent door assembly of FIG. 1, from the exterior/rear.
Figure 9:
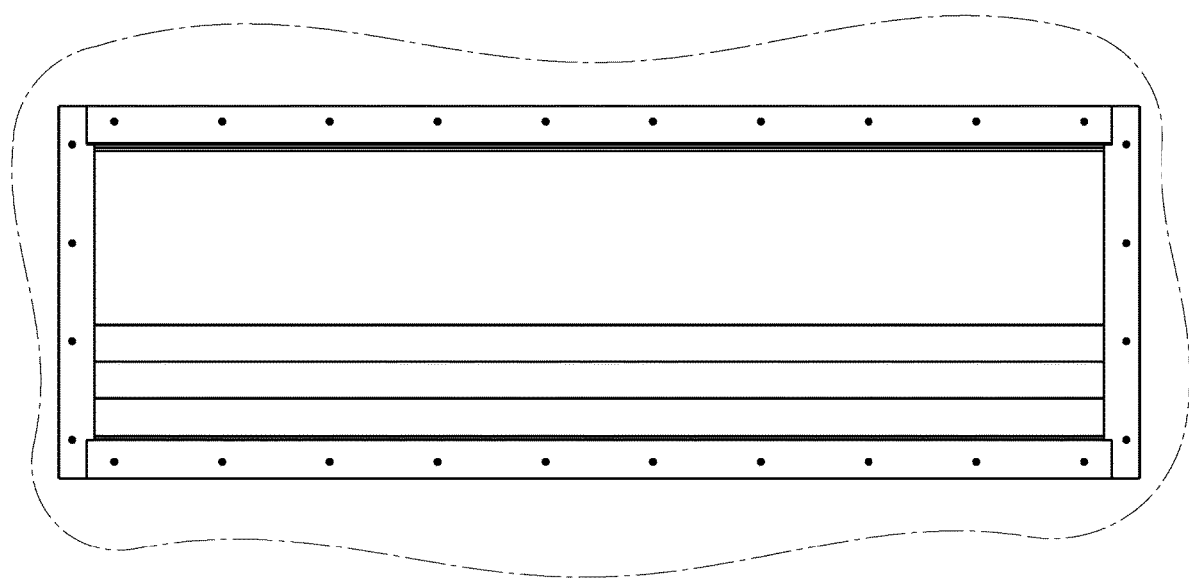
FIG. 9 is a rear elevation view of the wall vent door assembly of FIG. 8.
Figure 10:
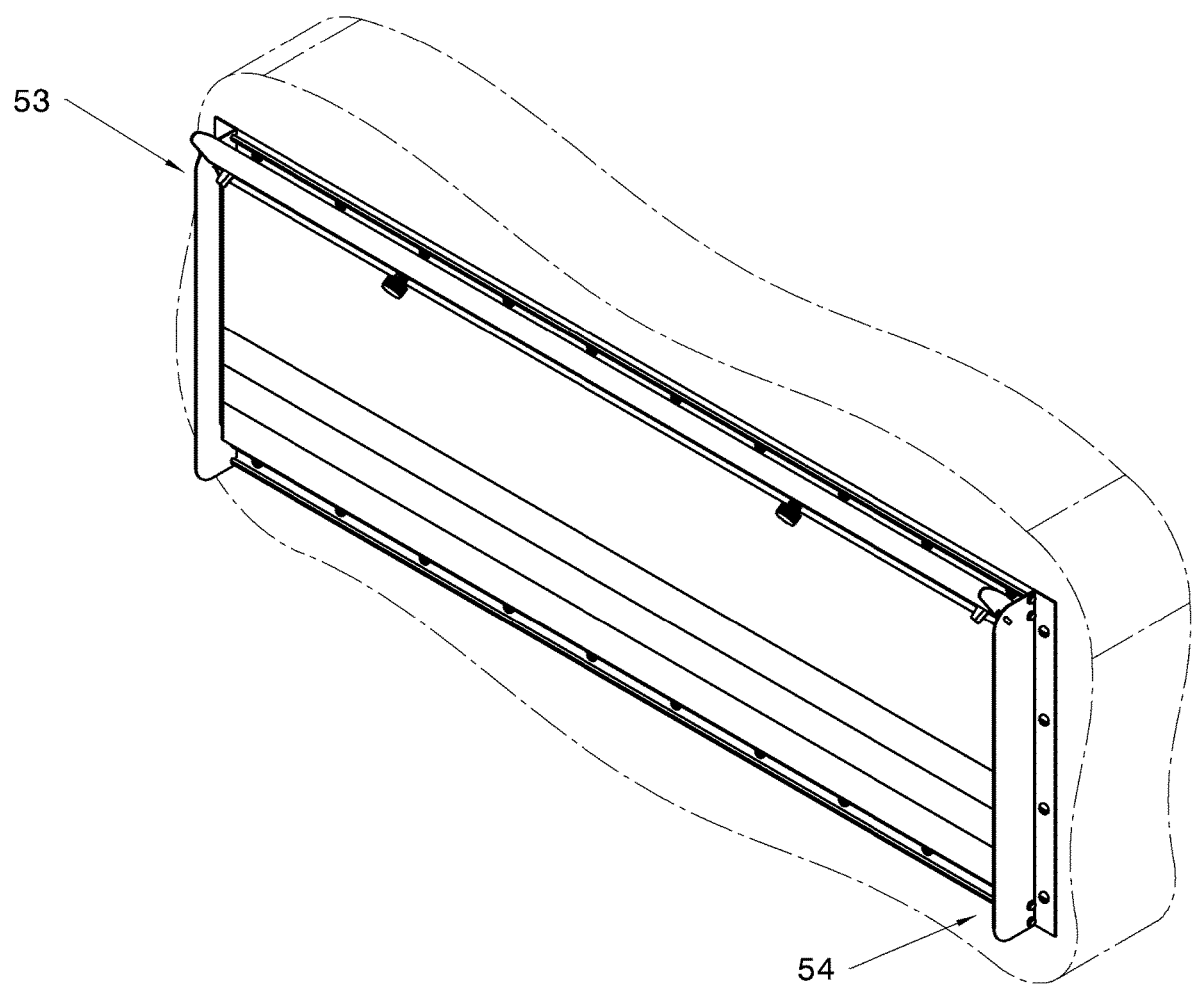
FIG. 10 is a perspective view of the wall vent door assembly of FIG. 1, in a fully closed position and with the split screw retainer (beneath screw cap) in alternative positions.
Figure 11:
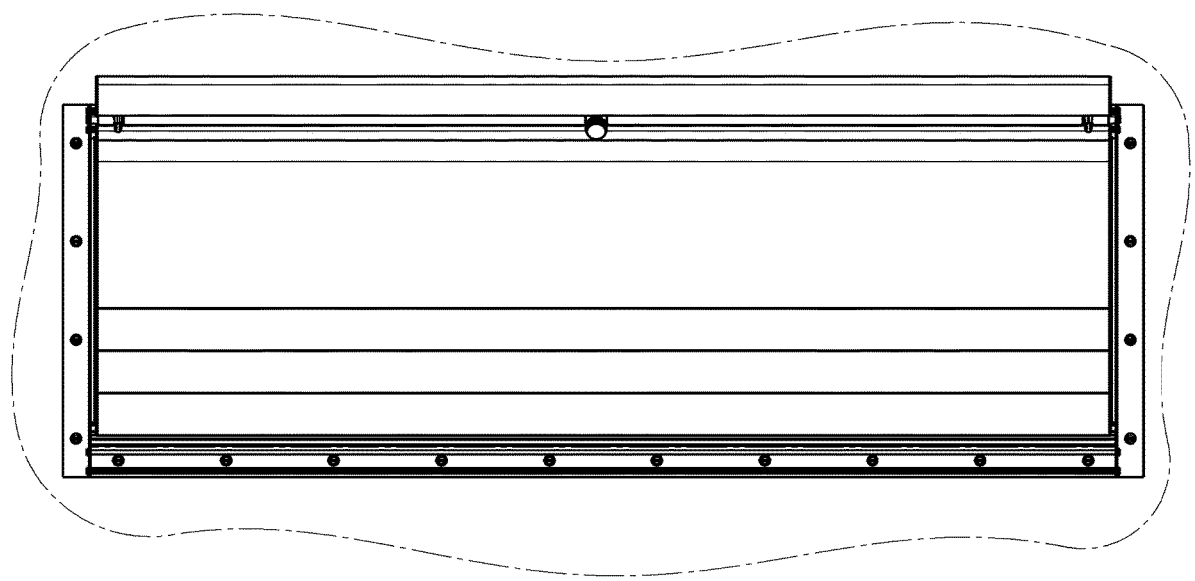
FIG. 11 is a front elevation view of the wall vent door assembly of FIG. 10, with a split screw retainer in a centered position.
Figure 12:
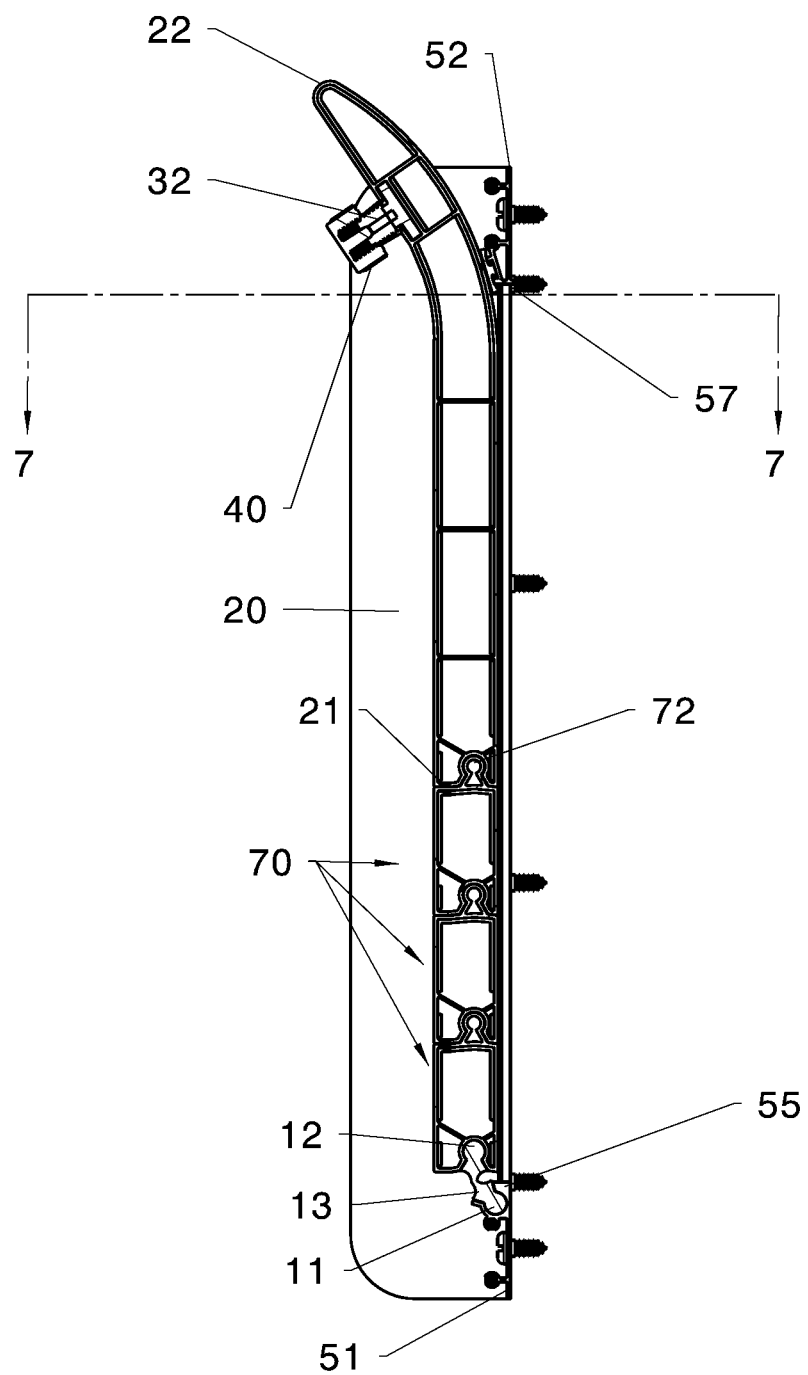
FIG. 12 is a cross-section view of the wall vent door assembly of FIG. 11, at plane 4-4 of FIG. 2.
Figure 13:
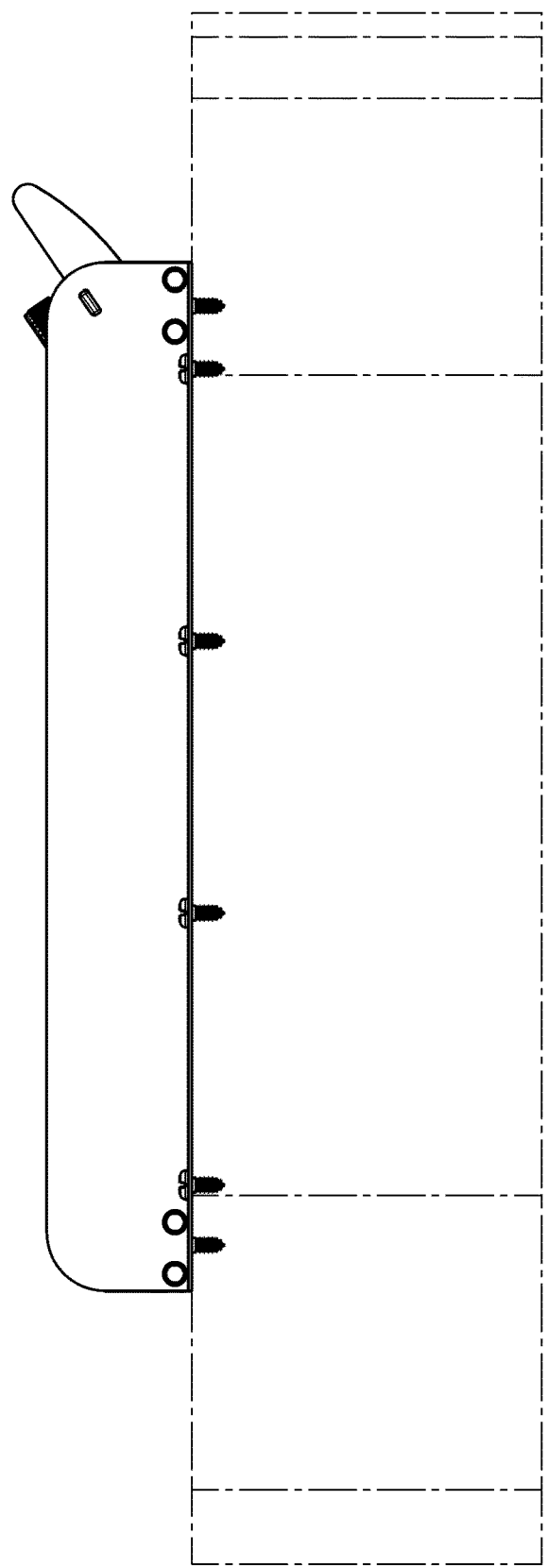
FIG. 13 is a right side elevation view of the wall vent door assembly of FIG. 11.

These drawings do not depict all possible embodiments of the invention disclosed.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

The terminology used herein is for the purpose of describing particular embodiments only and is not intended to be limiting. As used herein, the singular forms "a", "an", and "the" are intended to include the plural forms as well, unless the context clearly indicates otherwise; for example, fluid pathway can mean either a single pathway or multiple pathways. It will be further understood that the terms "comprises" and/or "comprising", or "includes" and/or "including", or "have" or "having", when used in this specification, specify the presence of stated features, regions, integers, steps, operations, elements and/or components, but do not preclude the presence or addition of one or more other features, regions, integers, steps, operations, elements, components and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element. Likewise, synonyms for the same element, term or concept may be used only to distinguish one similar element from another, unless the context clearly indicates otherwise.

The disclosure herein is not limited by construction materials to the extent that other materials satisfy the structural and/or functional requirements. For example, any material may be used so long as it satisfies the functional and structural requirements for which it is being used. In one embodiment, the mounting frame is constructed of aluminum or other structural metallic material; however, any material may suffice as well, if it satisfies the functional and structural requirements for which it is being used. For example, other embodiments of the mounting frame may be constructed of suitable polymeric material such as PVC (polyvinyl chloride) or the like. Likewise, the disclosed invention is not limited by any construction process or method. In another example, the hinge comprises a flexible and resilient material extending continuously along the hinge edge of the door and the pivot edge of the frame. The material may be santoprene to resist weathering, and have a durometer A-scale rating of about 70 plus or minus 10) so that the hinge acts like a spring to urge the door from a closed position to an open position. However, other material may be used if it satisfies the functional and structural requirements.

The invention is comprised of an assembled wall vent unit that is intended to be installed in a wall opening/space to the interior of the structure. The opening height is intended to be 8 inches, or greater in increments of 2 inches. The width can be any width as long as it is known prior to the construction of the wall vent units, so that a frame and door assembly of appropriate width can be fabricated.

The assembled wall vent unit is comprised of a door made of PVC or similar material with sufficient rigidity and durability to perform as intended. The door can be non-insulated, or insulated by means of a foam injection prior to final assembly. The door includes contouring that facilitates and provides adequate airflow and airflow direction resembling the Coandă Effect (the tendency of a fluid jet to remain attached to a convex surface). Prior to final assembly, the door ends may be enclosed by means of end caps, preferably injection molded, that may also include a wool pile sweep or similar device that seals against the side frame to reduce or prevent air leakage and/or an undesired airflow as the door opens or is in the open position. Depending on the height of the gap in the wall opening between the door portion of the vent assembly and the bottom of the wall opening, one or more 2-inch extensions may be incorporated into the bottom portion of the wall vent assembly, below the door and filling the gap. The extension parts can be non-insulated, or insulated in the same manner as the wall vent door. The end edges of the extension(s) may also be enclosed by means of end caps, preferably injection molded.

The wall vent door may also include an integrated channel or track, preferably having a "T"-shaped profile or cross-section that will receive a split-screw device for the retention of the control cord. Due to the design of the "T"-shaped track, the split-screw device can be placed at any location along the width of the door, to accommodate the location of the actuator rod system (trunk line). The actuator rod system or trunk line will control all of the wall vents on one entire wall of a poultry house. This is current practice in these houses. The trunk line is installed after the installation of the wall vents, so that the height of the trunk line is correct. What is novel and non-obvious about our design is that the split screw cord retainer can be moved to the proper location in relation to where the installer or end user wants to attach to the trunk line.

The wall vent door is attached to the wall vent frame by means of a flexible sealing hinge that fits in a channel in the bottom frame or in a pocket in the door/extension depending on whether an extension is used or not. If an extension or extensions are needed, then the flexible hinge seal will be installed in the extension rather than the door. The bottom of the extension has the same pocket configuration as the bottom of the door so it can accept the top of another extension or the hinge seal. The extensions are snapped into the bottom pocket of the door or into the pocket of a previously installed extension; the door and extension assembly do not pivot relative to each other. They may also be glued in place. This creates a rigid assembly that will operate as the door by itself.

The other three sides of the frame contain a vinyl bulb seal that allows the door to be sealed on all sides when in the closed position.

The invention is to provide ventilation to the interior of the structure and is to be controlled automatically by means of an existing climate monitoring system and an existing mechanical control actuator rod (trunk line). The monitoring system will determine the need for additional ventilation and the actuator rod will move thus opening the wall vent. The monitoring system will determine when adequate ventilation has been applied and move the actuator rod in the opposite direction thus closing the wall vent.

Construction of the Wall Vent Assembly

The construction of the wall vent assembly may occur in a variety of manners and sequences. In one embodiment, the wall vent door and extension are of an extruded PVC construction. They are extruded on exclusive tooling that were designed and built based on the unique designs of the profiles. They are purchased in bulk and cut to length based on the wall opening width. The wall vent frame components can be either extruded PVC or extruded aluminum. Both are produced on exclusive tooling that was designed and built based on the unique designs of the profiles. They are purchased in bulk and the top and bottom frames are cut to length based on the wall opening width. The side frames are cut to length based on the wall opening height.

Once all components are cut to length, one side frame piece is fitted with a bulb seal that has been cut to length. The bottom and top frame pieces are screwed in place with the side frame piece and the top frame is fitted with a bulb seal.

Depending on the height of the wall opening, it may be necessary to attach extensions to the bottom of the door prior to fitting a precut hinge into the pocket of either the door or extension. The extensions are to be snapped into place with an adhesive for rigidity. All end caps are glued in place and the hinge is then slid into the pocket and slid into the pocket of the bottom frame piece.

Once in place the other side frame piece is screwed into place.

The completed unit is then bulk packed or packed individually.

All PVC components can be insulated with a foam insulation prior to installation of the end caps and final assembly.

One general embodiment of the invention comprises a vent door assembly for mounting into a portal space in the wall of a structure to be vented, the vent door assembly including a hinge member (10) including flexibly resilient material defining a pivot edge (11) and a hinge edge (12). Also included is a substantially square or rectangular frame comprising a pivot piece having a pivot edge (55) in cooperating relationship with the hinge member pivot edge, and an opposite second piece (52). The frame also includes a third piece (such as providing a left-side vertical boundary) and a fourth piece (such as providing a right-side vertical boundary), each connecting the pivot piece and the opposite second piece. Also included is a door configured to fully obstruct the portal space framed by the frame, the door including a hinge edge (21) in cooperating relationship with the hinge member hinge edge (12), an opposite second edge (22), and a third edge (such as a left-side edge, 23) and a fourth edge (such as a right-side edge, 24). The hinge member extends substantially the length of the frame pivot edge and the door hinge edge, thereby preventing entry of light and airflow between the edges.

The frame pivot edge may define a pivot channel adapted to firmly retain the hinge member pivot edge for the cooperating relationship. The door hinge edge may define a hinge channel adapted to firmly retain the hinge member hinge edge for the cooperating relationship. Preferably the hinge member pivot edge has a bulbous cross-section, and the hinge member hinge edge has a bulbous cross-section. The hinge member may further include an intermediate portion (13) between the pivot edge and the hinge edge, adapted to assist in pivoting of the door between a fully closed position and a fully open position. The frame pivot edge pivot channel and the door hinge edge hinge channel are preferably oriented so that the hinge member is in its natural resting state when the door is in a fully open position. The hinge member may have a Shore A-scale durometer rating of at least about 60. Alternatively, the hinge member may have a Shore A-scale durometer rating at least in the range of approximately 60 to approximately 80. Alternatively, the hinge member may have a Shore A-scale durometer rating of about 70.

Another embodiment comprises a vent door assembly further including:

(a) a second-piece seal (57) attached to the frame second piece and extending thereon from at least near the frame third piece to at least near the frame fourth piece;

(b) a third-piece seal (60) attached to the frame third piece and extending thereon from at least near the frame second piece to at least near the frame pivot piece; and (c) a fourth-piece seal (64) attached to the frame fourth piece and extending thereon from at least near the frame second piece to at least near the frame pivot piece. Fully closing the door causes contact along the seals to prevent entry of light and airflow.

In another embodiment of the vent door assembly, the frame third piece may further include a third-piece wall-mount margin (58) and the frame fourth piece further including a fourth-piece wall-mount margin (62); the margins extend away from the portal space framed by the frame to facilitate mounting in portal space in the wall having materially larger dimensions than the portal space framed by the frame. The frame third piece may further include a third-piece baffle (61) outstanding substantially perpendicularly to the third-piece wall-mount margin; the frame fourth piece may further include a fourth-piece baffle (65) outstanding substantially perpendicularly to the fourth-piece wall-mount margin. Each of the baffles directs incoming airflow along the door and reducing the lateral leakage of light into the structure when the door is open.

Another embodiment of the vent door assembly may further include an end cap (25) covering the door third edge; another end cap (26) may also cover the door fourth edge. A longitudinal sweep protuberance (27) may be mounted on the door third end cap, and a separate longitudinal sweep protuberance (28) may be mounted on the door fourth end cap. Each sweep protuberance protrudes a sufficient distance to graze the respective frame third piece baffle or frame fourth piece baffle to further seal against entry of light and airflow when the door is in a fully or partially closed position.

Another embodiment of the vent door assembly may further include a door extender member including:

(a) an extender hinge edge (71) having the same configuration as the door hinge edge for a cooperating relationship with the hinge member hinge edge;

(b) an extender second edge (72) having the same configuration as the hinge member hinge edge for cooperating relationship with the door hinge edge; and (c) a third edge (73) and a fourth edge (74) separating the extender hinge edge and extender second edge a desired length of extension. An end cap may cover the extender third edge, and another end cap may cover the extender fourth edge. Alternatively, a single end cap may cover the door end and the end(s) of the associated extender(s).

In another embodiment of the vent door assembly, the door may further include a region near the second edge having aerodynamic contouring facilitating, when the door is open, airflow entry in a manner reducing turbulence within the structure. The door may further include a guide track (29) extending along an interior accessible face from at least near the third edge to at least near the fourth edge. The track is preferably adapted to coordinate with a catch movable along the track to a desired location and governing the length of a cord controlling the amount of opening of the door. The catch may include a bolt having a head end (31)

and a threaded terminus (32) adapted to capture the cord and maintain a particular length thereof. The threaded terminus may define a split along its axis, and have a depth sufficient to accept the cord inserted therethrough; the catch may further include a retainer screw-cap (40) for rotational mating with the threaded terminus to simultaneously fix the location of the bolt within the channel and fix the length of the cord. The track may also include a channel extending from the door third edge to the door fourth edge, and adapted to capture the head of the cord-catch bolt slidable within the track.

In another embodiment of the vent door assembly, the frame second piece may further include a mounting guide flange (56) outstanding substantially perpendicularly from an exterior-facing face of the frame second piece, the flange abutting the top edge of the portal space in the wall to facilitate stable mounting on the wall.

Another embodiment comprises a vent door assembly for mounting into a portal space in the wall of a structure to be vented, the vent door assembly including:

(a) a hinge member including flexibly resilient material defining a pivot edge having a bulbous cross-section and a hinge edge having a bulbous cross-section;

(b) a substantially square or rectangular frame including a pivot piece including a pivot edge defining a pivot channel adapted to firmly retain the hinge member pivot edge for a cooperating relationship with the hinge member pivot edge, an opposite second piece, and a third piece and a fourth piece each connecting the pivot piece and the second piece; and (c) a door configured to fully obstruct the portal space framed by the frame, the door including a hinge edge defining a hinge channel adapted to firmly retain the hinge member hinge edge for a cooperating relationship with the hinge member hinge edge, an opposite second edge, and a third edge and a fourth edge; wherein the hinge member extends substantially the length of the frame pivot edge and the door hinge edge, thereby preventing entry of light and airflow between the edges.

In another embodiment, the hinge member may further include an intermediate portion between the pivot edge and the hinge edge, adapted to facilitate pivoting of the door between a fully closed position and a fully open position, wherein the frame pivot edge pivot channel and the door hinge edge hinge channel are oriented so that the hinge member is in its natural resting state when the door is in a fully open position.

Another embodiment may further include a door extender member including:

(a) an extender hinge edge having the same configuration as the hinge member hinge edge for a cooperating relationship with the door hinge edge;

(b) an extender second edge having the same configuration as the door hinge edge for cooperating relationship with the hinge member hinge edge; and (c) an extender third edge and an extender fourth edge separating the extender hinge edge and extender second edge a desired length of extension.

Another embodiment may further include:

(a) an end cap covering the door third edge and the extender third edge, and a longitudinal sweep protuberance mounted on the end caps; and (b) an end cap covering the door fourth edge and the extender fourth edge, and another longitudinal sweep protuberance mounted on the end caps; wherein each sweep protuberance protrudes a sufficient distance to graze the respective frame third piece baffle or frame fourth piece baffle to further seal against entry of light and airflow when the door is in a fully or partially closed position.

In another embodiment:

(a) the door further comprises a guide channel extending along an interior accessible face from the third edge to the fourth edge, the channel adapted to coordinate with;

(b) a catch movable along the channel to a desired location and governing the length of a cord controlling the amount of opening of the door, the catch including a bolt having a head end captured within the channel and a threaded terminus defining a split along its axis and having a depth sufficient to accept the cord inserted therethrough; and (c) a retainer screw-cap for rotational mating with the threaded terminus to simultaneously fix the location of the bolt within the channel and fix the length of the cord.

Mounting of the Wall Vent Unit in the Structure

Besides the wall vent door assembly, the invention disclosed herein includes a method of installing it.

Figure 14:
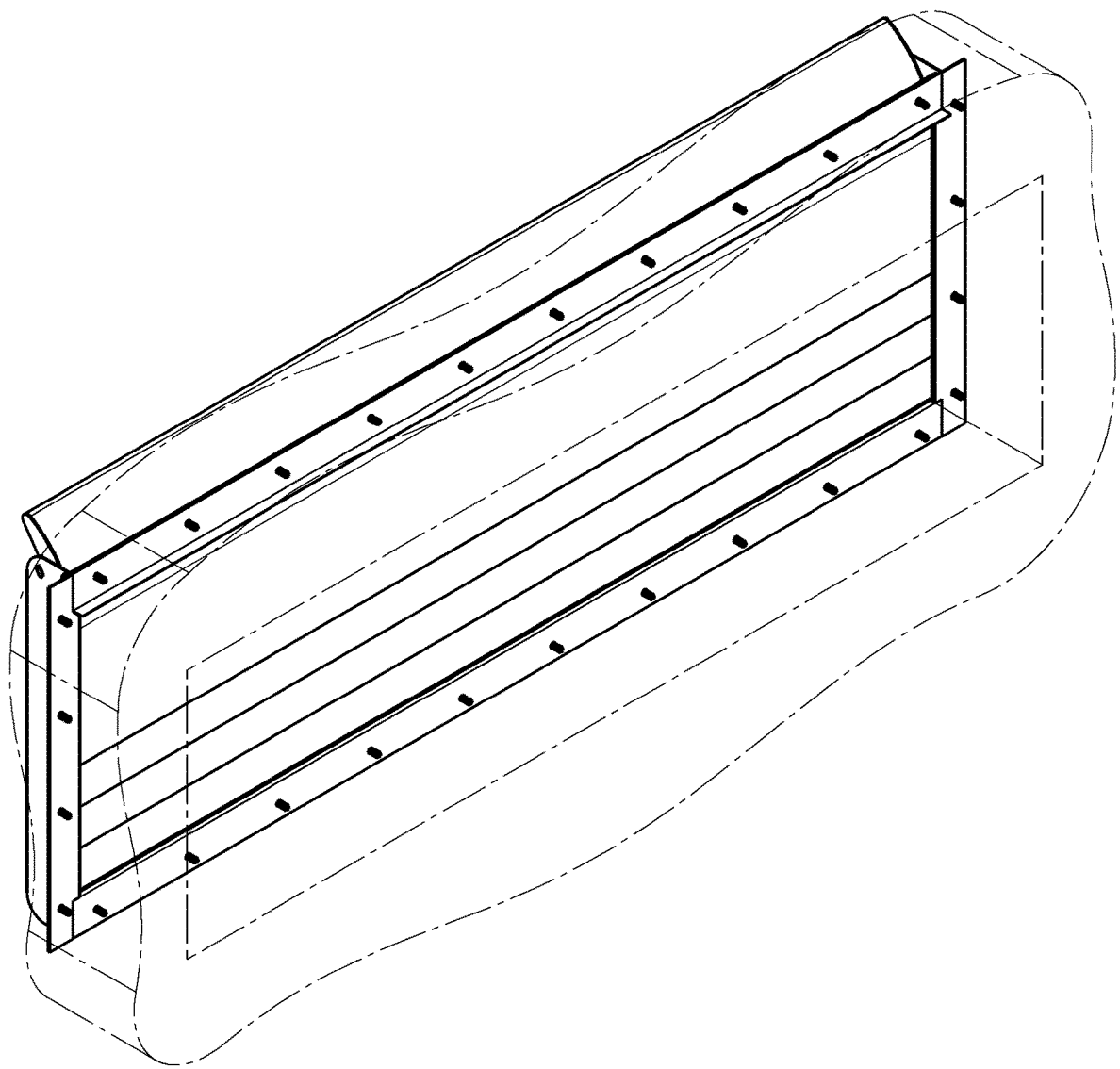
FIG. 14 is a perspective view of the wall vent door assembly of FIG. 11, from the exterior.
Figure 15:
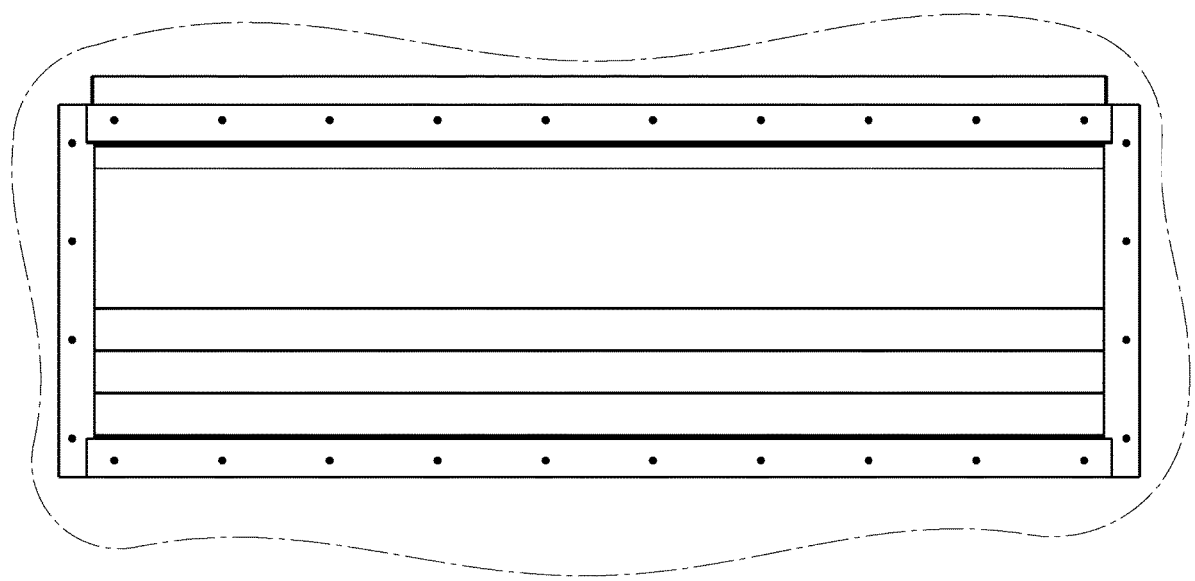
FIG. 15 is an elevation view of the wall vent door assembly of FIG. 14.
Figure 16:
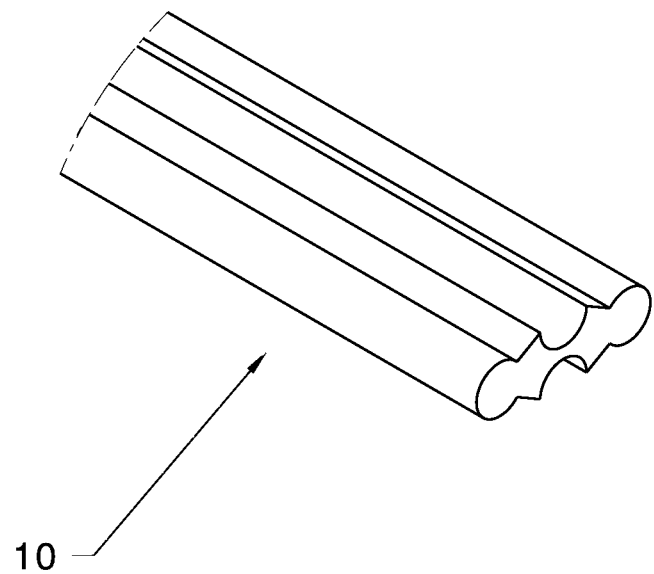
FIG. 16 is a perspective view of a representative sample of the flexible and resilient hinge material (isolated), in a natural resting configuration.
Figure 17:
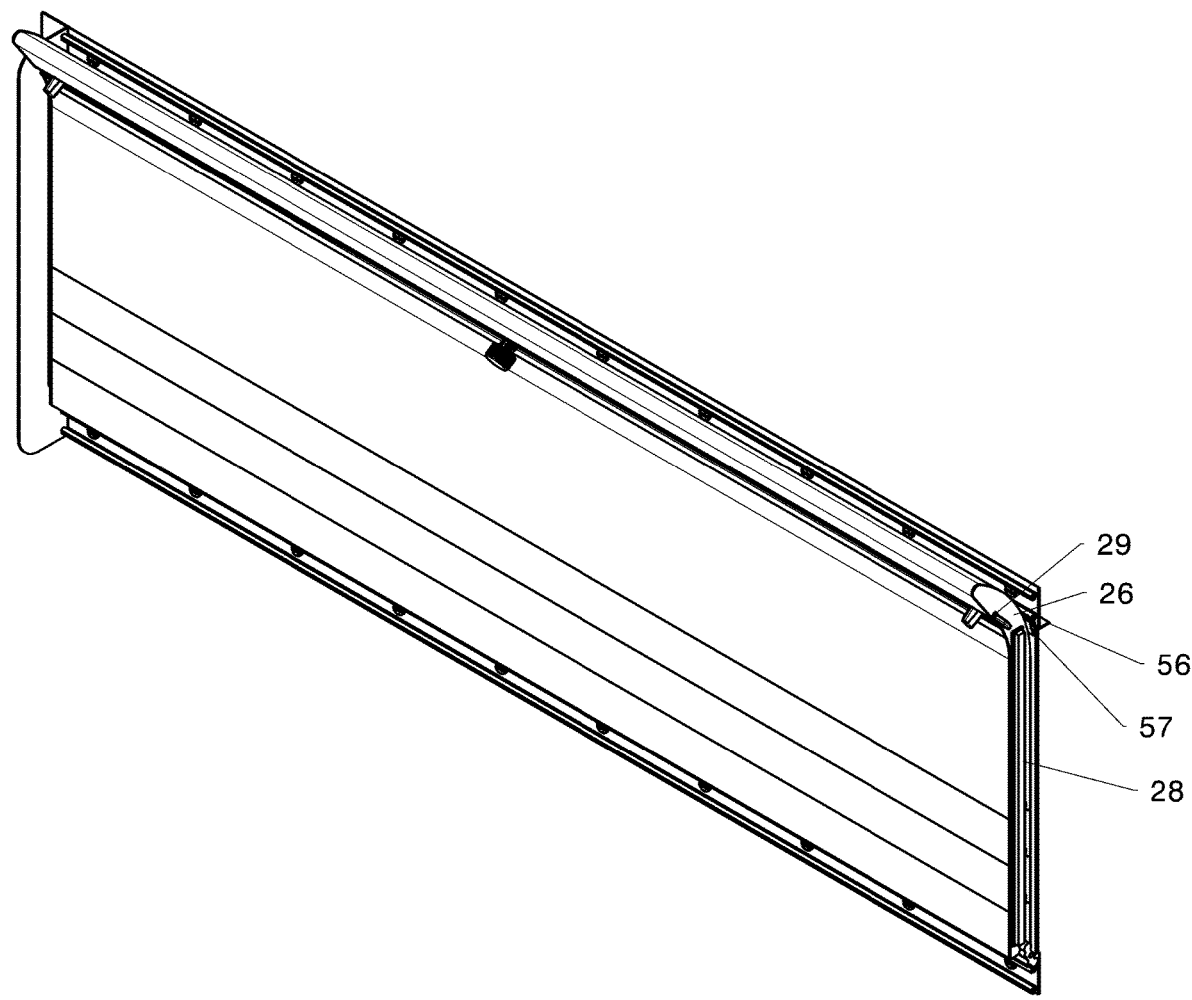
FIG. 17 is perspective view of the closed wall vent door assembly of FIG. 11, with the vertical baffles removed and showing the door almost completely mated with the flexible and resilient hinge member (which is fully mated with the hinge edge of the mounting frame).
Figure 18:
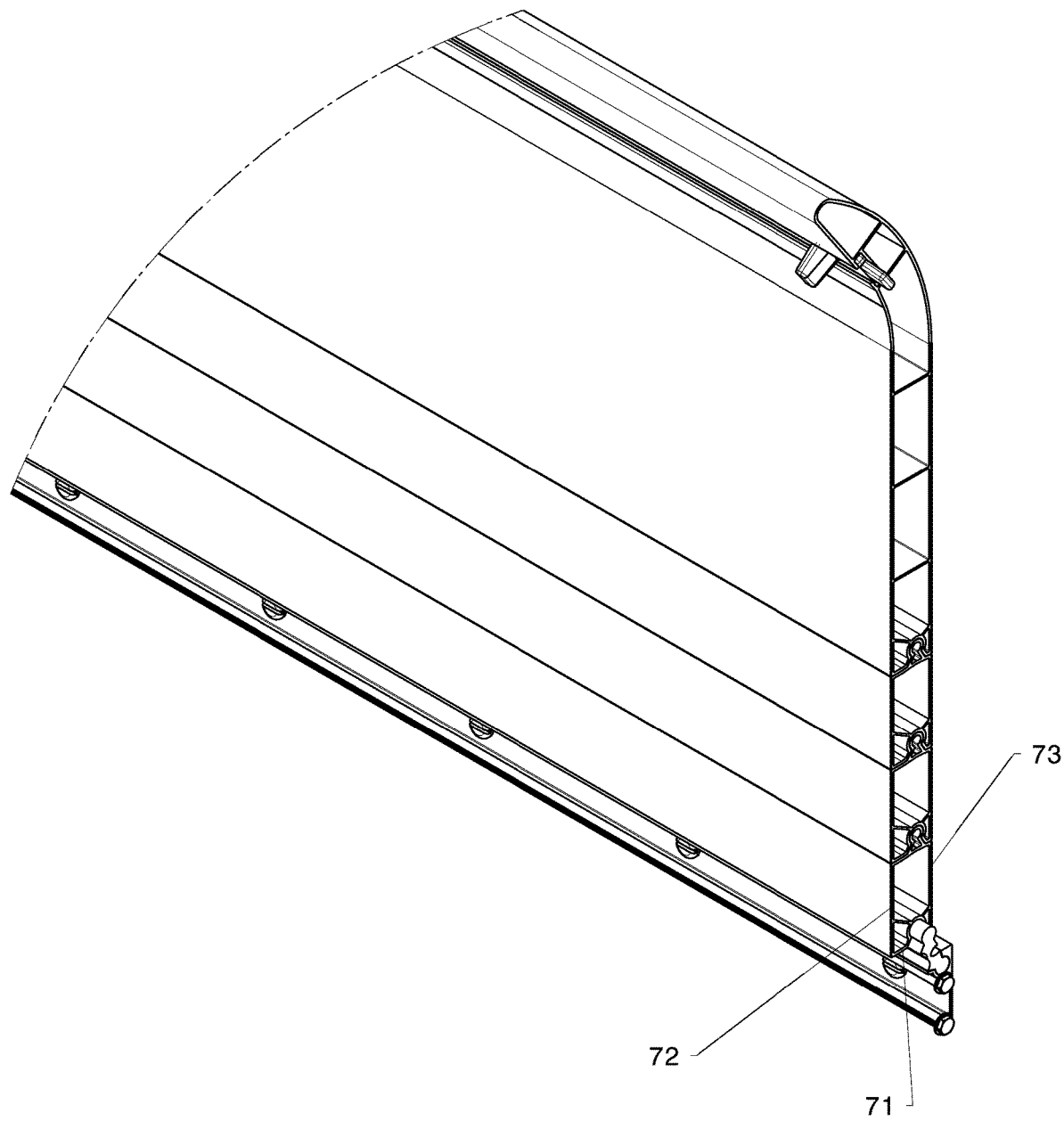
FIG. 18 is a perspective view of the open vent door of FIG. 1, mated with a representative sample of an extension element which is almost completely mated (via a flexible and resilient hinge member) with a representative sample of a hinge edge of an extended mounting frame.
Figure 19:
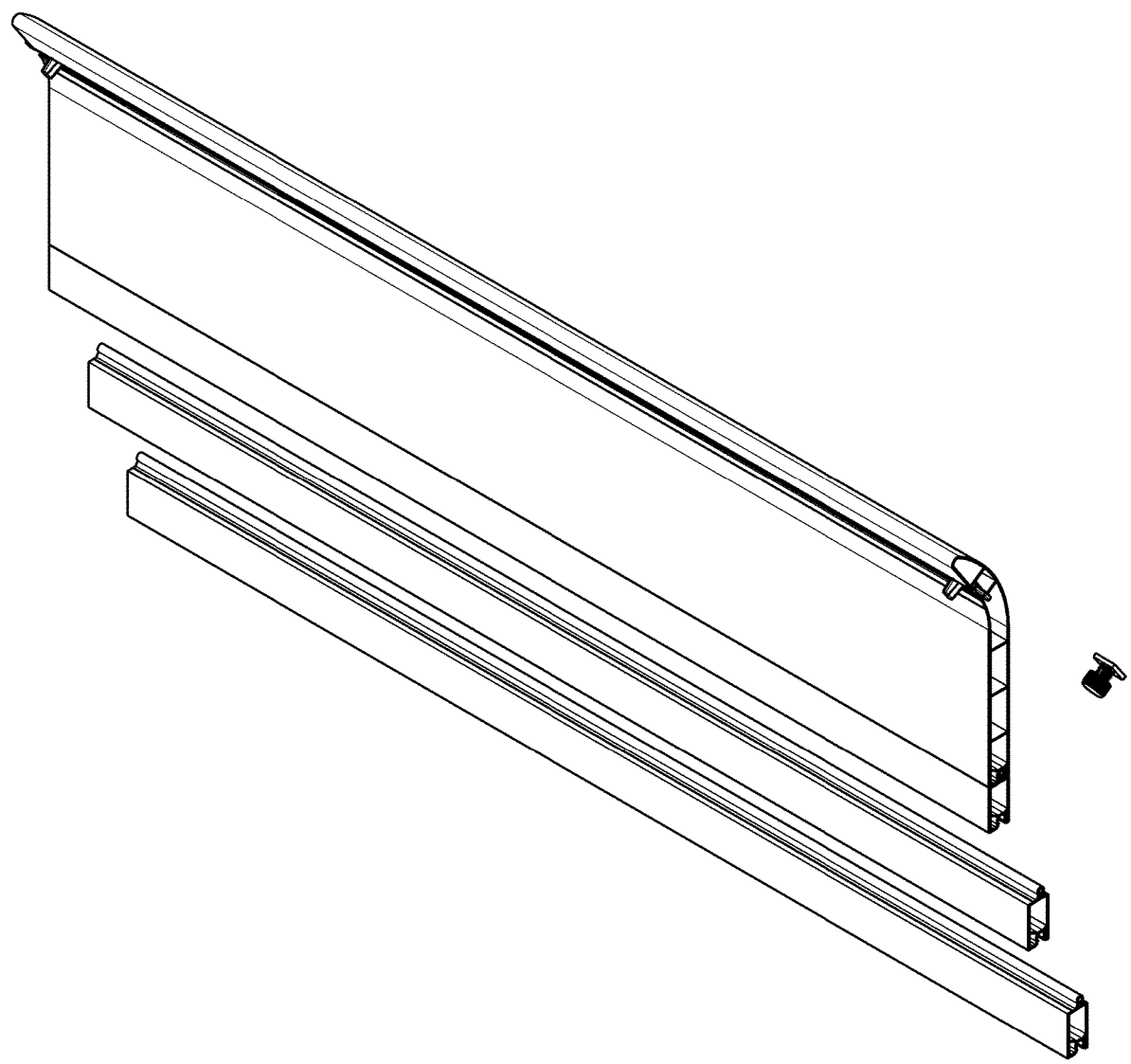
FIG. 19 is an exploded view of the vent door and extension element and split screw retainer of FIG. 18.
Figure 20:
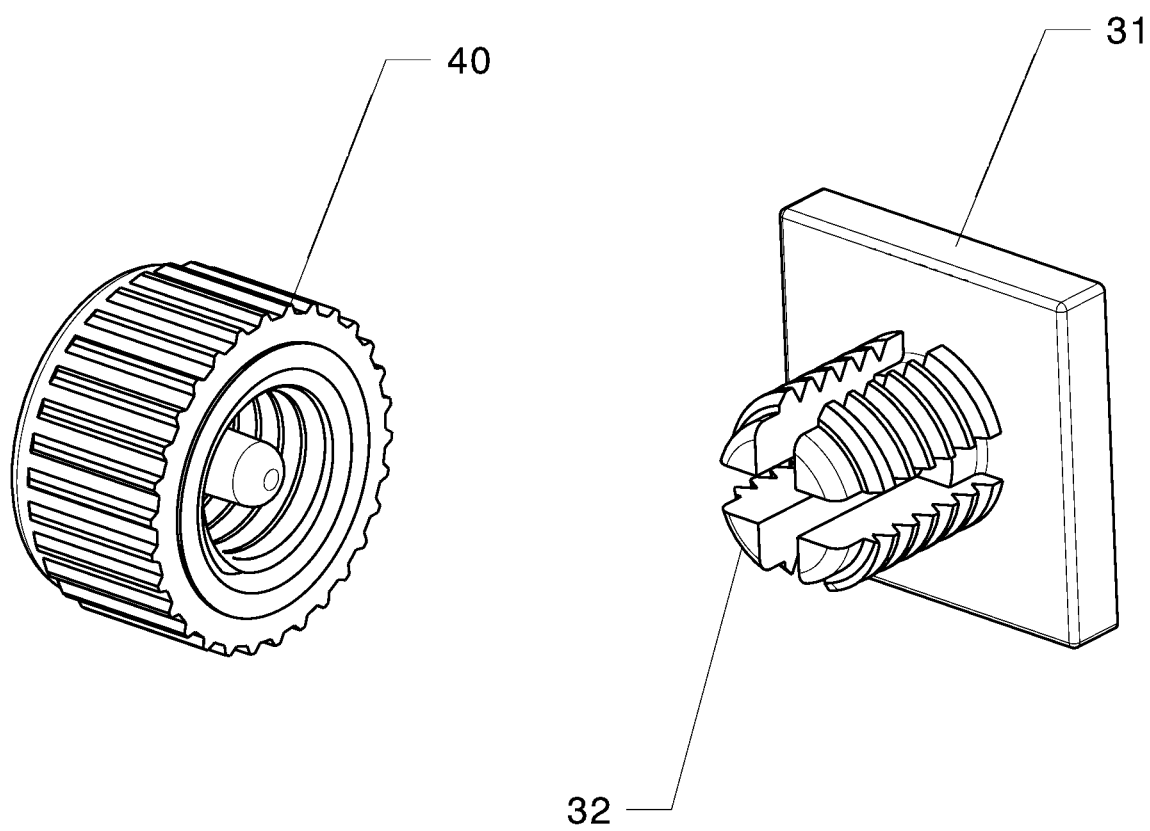
FIG. 20 is a perspective view of a representative sample of a split screw and complimentary retainer cap.
Figure 21:
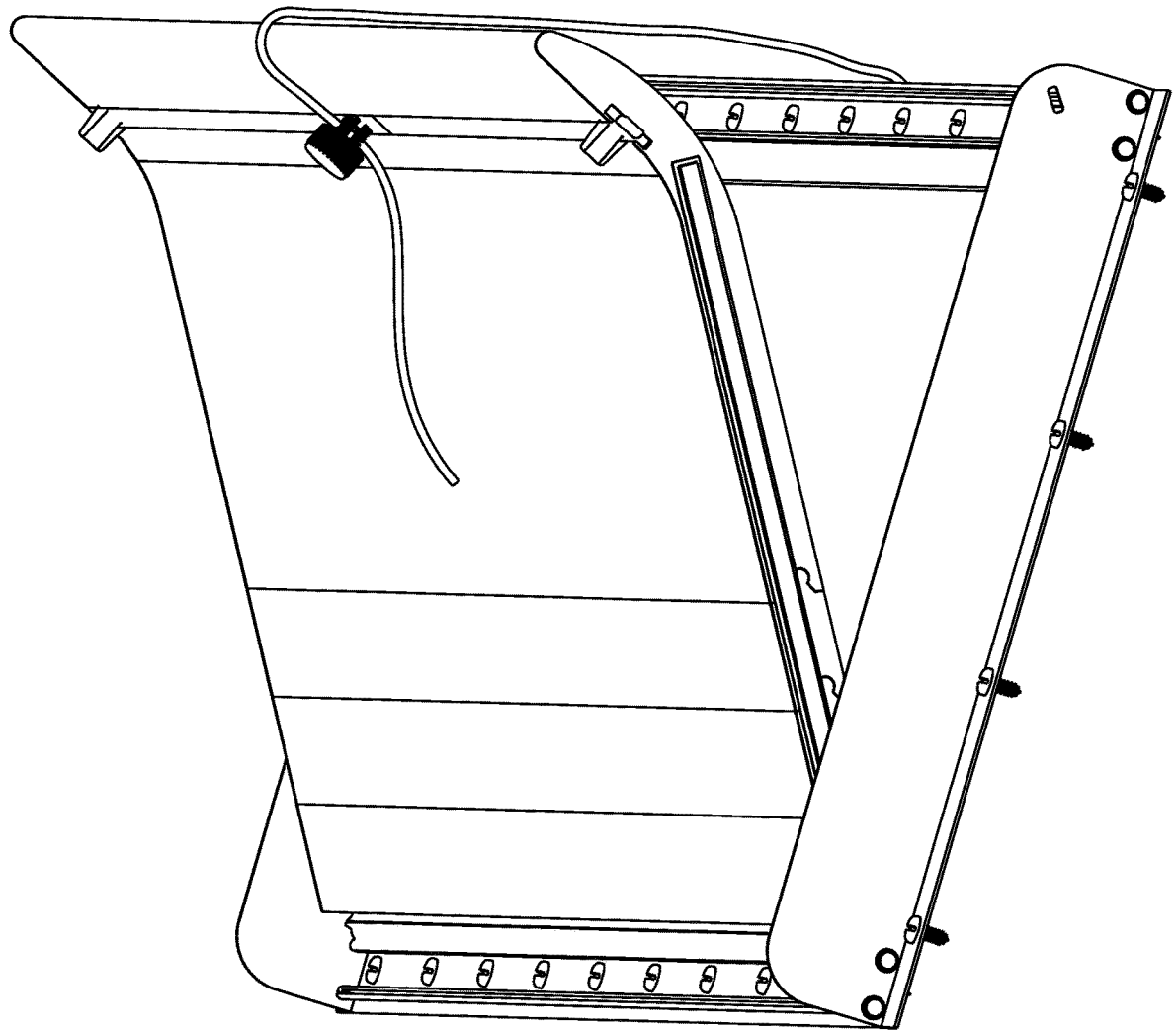
FIG. 21 is a perspective view (from the interior of the vented structure) of a representative sample of a partially open wall vent door assembly having a cord (partially shown) threaded through a split screw retainer within a guide track, for governing the amount of opening.
Figure 22:
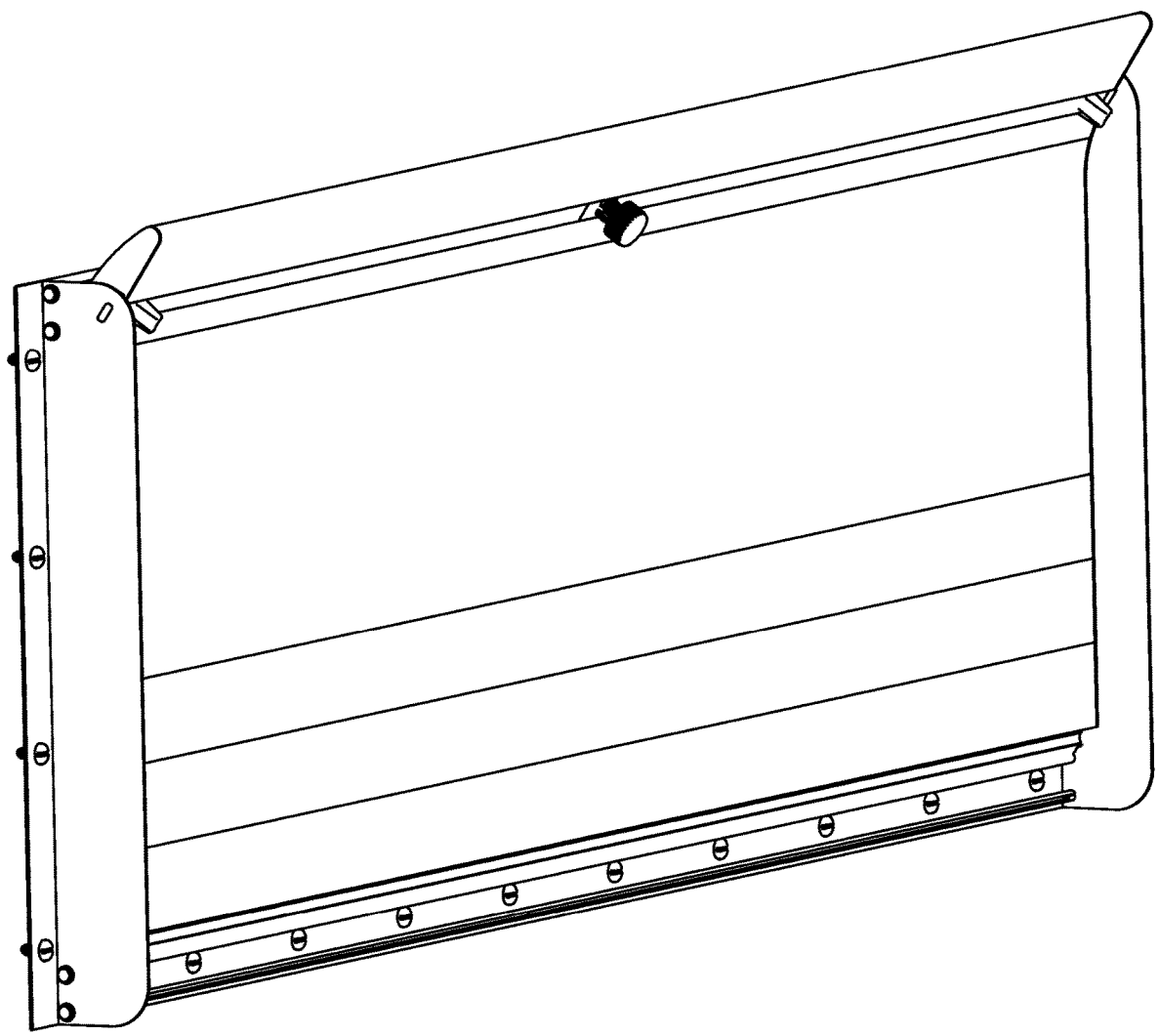
FIG. 22 is a perspective view of the wall vent door assembly of FIG. 21, in a fully closed configuration (and without the cord).
Figure 23:
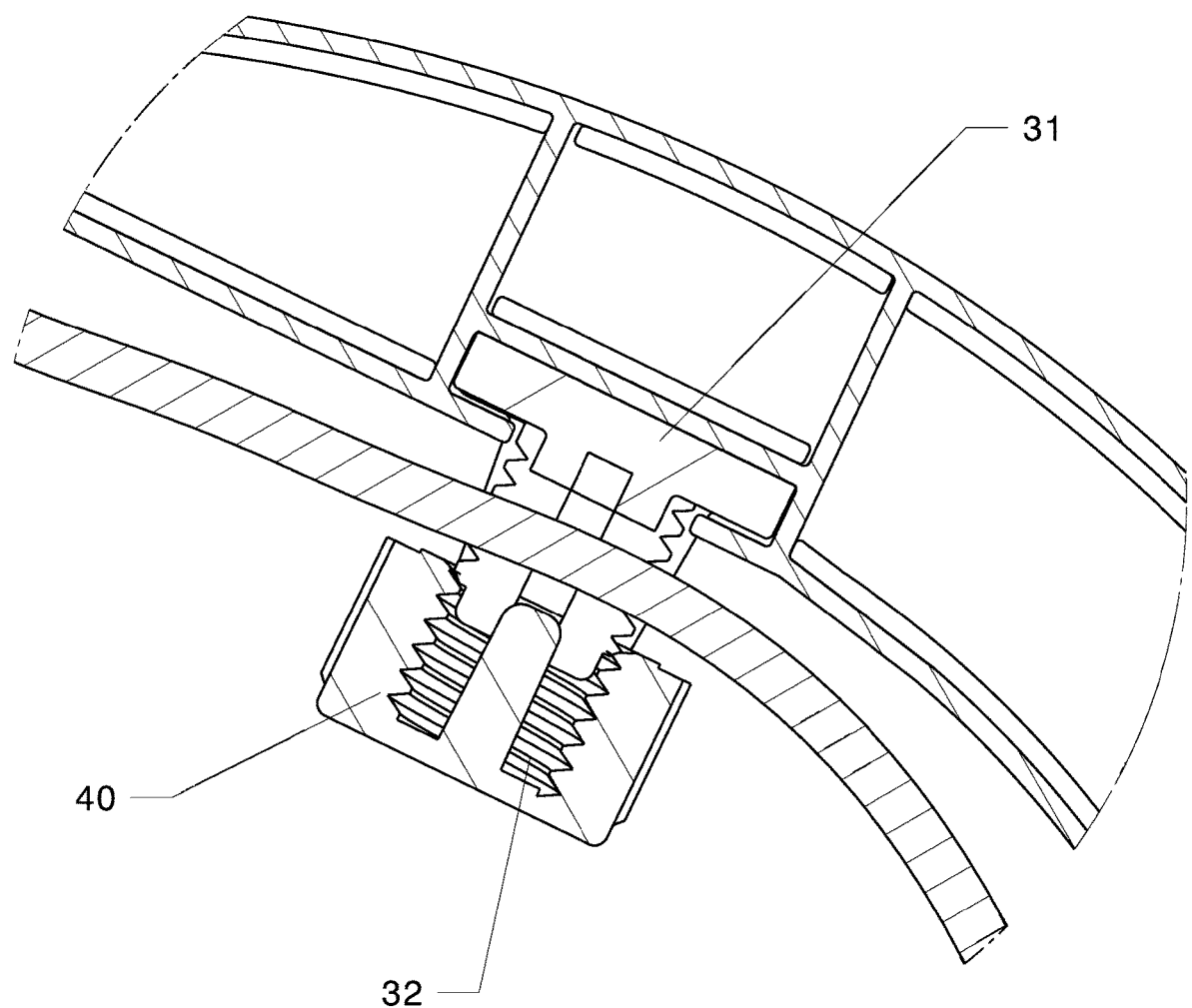
FIG. 23 is a close-up view of the encircled portion of FIG. 4.

The wall vent units are received by the customer in bulk, or in individual packaging. The units are unpacked and placed in the wall openings, and then lifted until the locating ledge on the back side of the top frame piece contacts the top of the wall opening. (See mounting guide flange (56) in FIG. 14.) Once in place, the unit is screwed into the wall via the mounting holes in the wall vent frame.

A split screw retainer is installed in the track or channel in a vent door, and a control cord is inserted within the split, before the cap is screw-tightened.

The mounting method may also include the steps of:

(a) measuring the wall opening to determine whether a taller mounting frame should be utilized; and, if necessary (b) selecting the taller mounting frame and the number of extension elements to fill the gap between the bottom of the mounting frame and the hinge edge of the door.

Other utility and advantages will be apparent to somebody of ordinary skill in the field, upon a review of this application.

We claim:

1. A vent door assembly for mounting into a portal space in the wall of a structure to be vented, the vent door assembly comprising:

(a) a hinge member comprising flexibly resilient material defining a pivot edge and a hinge edge;

(b) a substantially square or rectangular frame comprising a first piece comprising a pivot piece including a pivot edge in cooperating relationship with said hinge member pivot edge, an opposite second piece, and a third piece and a fourth piece each connecting said pivot piece and said second piece; and (c) a door configured to fully obstruct the portal space framed by said frame, said door comprising a first edge comprising a hinge edge in cooperating relationship with said hinge member hinge edge, an opposite second edge, and a third edge and a fourth edge; wherein said hinge member extends substantially the length of said frame pivot edge and said door hinge edge, thereby preventing entry of light and airflow between said edges.

2. A vent door assembly described in claim 1, said frame pivot edge defining a pivot channel adapted to firmly retain said hinge member pivot edge for said cooperating relationship, said door hinge edge defining a hinge channel adapted to firmly retain said hinge member hinge edge for said cooperating relationship.

3. A vent door assembly described in immediately preceding claim 2, said hinge member pivot edge having a bulbous cross-section, and said hinge member hinge edge having a bulbous cross-section.

4. A vent door assembly described in immediately preceding claim 3, said hinge member further comprising an intermediate portion between said hinge member pivot edge and said hinge member hinge edge, adapted to assist in pivoting of said door between a fully closed position and a fully open position.

5. A vent door assembly described in immediately preceding claim 4, wherein said frame pivot edge pivot channel and said door hinge edge hinge channel are oriented so that said hinge member is in its natural resting state when said door is in a fully open position.

6. A vent door assembly described in immediately preceding claim 5, said hinge member having a Shore A-scale durometer rating of at least about 60.

7. A vent door assembly described in immediately preceding claim 6, said hinge member having a Shore A-scale durometer rating at least in the range of approximately 60 to approximately 80.

8. A vent door assembly described in immediately preceding claim 7, said hinge member having a Shore A-scale durometer rating of about 70.

9. A vent door assembly described in claim 1, further comprising:
(a) a second-piece seal attached to said frame second piece and extending thereon from said frame third piece to said frame fourth piece;
(b) a third-piece seal attached to said frame third piece and extending thereon from said frame second piece to said frame pivot piece; and
(c) a fourth-piece seal attached to said frame fourth piece and extending thereon from said frame second piece to said frame pivot piece; wherein
fully closing said door causes contact along said seals to prevent entry of light and airflow.

10. A vent door assembly described in claim 1, said frame third piece further comprising a third-piece wall-mount margin and said frame fourth piece further comprising a fourth-piece wall-mount margin, said margins extending away from the portal space framed by said frame to facilitate mounting in portal space in the wall having materially larger dimensions than the portal space framed by said frame.

11. A vent door assembly described in immediately preceding claim 10, said frame third piece further comprising a third-piece baffle outstanding substantially perpendicularly to said third-piece wall-mount margin, said frame fourth piece further comprising a fourth-piece baffle outstanding substantially perpendicularly to said fourth-piece wall-mount margin, each of said baffles directing incoming airflow along said door and reducing the lateral leakage of light into the structure when said door is open.

12. A vent door assembly described in claim 11, further comprising an end cap covering said door third edge, another end cap covering said door fourth edge, a longitudinal sweep protuberance mounted on said door third end cap and a separate longitudinal sweep protuberance mounted on said door fourth end cap, wherein each sweep protuberance protrudes a sufficient distance to graze the respective frame third piece baffle or frame fourth piece baffle to further seal against entry of light and airflow when said door is in a fully or partially closed position.

13. A vent door assembly described in claim 3, further comprising a door extender member comprising:

(a) an extender first edge comprising an extender hinge edge having the same configuration as said door hinge edge for a cooperating relationship with said hinge member hinge edge;
(b) an extender second edge having the same configuration as said hinge member hinge edge for cooperating relationship with said door hinge edge; and
(c) a third edge and a fourth edge separating said extender hinge edge and extender second edge a desired length of extension;
wherein the door extender is positioned between the door and the hinge member so that the hinge member hinge edge maintains said cooperating relationship with the door extender hinge edge, and the door extender second edge maintains said cooperating relationship with the door hinge edge.

14. A vent door assembly described in immediately preceding claim 13, further comprising an end cap covering said extender third edge and another end cap covering said extender fourth edge.

15. A vent door assembly described in claim 1, said door further comprising a region near said second edge having aerodynamic contouring facilitating, when said door is open, airflow entry in a manner reducing turbulence within the structure.

16. A vent door assembly described in claim 1, said door further comprising a guide track extending along an interior accessible face from at least near said third edge to at least near said fourth edge, said track adapted to coordinate with a catch movable along said track to a desired location and governing the length of a cord controlling the amount of opening of said door.

17. A vent door assembly described in immediately preceding claim 16, said catch comprising a bolt having a head end and a threaded terminus adapted to capture said cord and maintain a particular length thereof.

18. A vent door assembly described in immediately preceding claim 17, said threaded terminus defining a split along its axis and having a depth sufficient to accept said cord inserted therethrough, said catch further comprising a retainer screw-cap for rotational mating with said threaded terminus to simultaneously fix the location of said bolt within said channel and fix the length of said cord.

19. A vent door assembly described in immediately preceding claim 18, said track comprising a channel extending from said door third edge to said door fourth edge and adapted to capture said head of said cord-catch bolt slidable within said track.

20. A vent door assembly described in claim 1, said frame second piece further comprising a mounting guide flange outstanding substantially perpendicularly from an exterior facing face of said frame second piece, said flange abutting the top edge of the portal space in the wall to facilitate stable mounting on the wall.

21. A vent door assembly for mounting into a portal space in the wall of a structure to be vented, the vent door assembly comprising:
(a) a hinge member comprising flexibly resilient material defining a pivot edge having a bulbous cross-section and a hinge edge having a bulbous cross-section;
(b) a substantially square or rectangular frame comprising a first piece comprising a pivot piece including a pivot edge defining a pivot channel adapted to firmly retain said hinge member pivot edge for a cooperating relationship with said hinge member pivot edge, an opposite second piece, and a third piece and a fourth piece each connecting said pivot piece and said second piece; and (c) a door configured to fully obstruct the portal space framed by said frame, said door comprising a first edge comprising a hinge edge defining a hinge channel adapted to firmly retain said hinge member hinge edge for a cooperating relationship with said hinge member hinge edge, an opposite second edge, and a third edge and a fourth edge; wherein said hinge member extends substantially the length of said frame pivot edge and said door hinge edge, thereby preventing entry of light and airflow between said edges.

22. A vent door assembly described in immediately preceding claim 21, said hinge member further comprising an intermediate portion between said hinge member pivot edge and said hinge member hinge edge, adapted to facilitate pivoting of said door between a fully closed position and a fully open position, wherein said frame pivot edge pivot channel and said door hinge edge hinge channel are oriented so that said hinge member is in its natural resting state when said door is in a fully open position.

23. A vent door assembly described in immediately preceding claim 22, further comprising a door extender member comprising:

(a) an extender first edge comprising an extender hinge edge having the same configuration as said hinge member hinge edge for a cooperating relationship with said door hinge edge;

(b) an extender second edge having the same configuration as said door hinge edge for cooperating relationship with said hinge member hinge edge; and (c) an extender third edge and an extender fourth edge separating said extender hinge edge and extender second edge a desired length of extension.

24. A vent door assembly described in immediately preceding claim 23, further comprising:

(a) an end cap covering said door third edge and said extender third edge, and a longitudinal sweep protuberance mounted on said end caps; and (b) an end cap covering said door fourth edge and said extender fourth edge, and another longitudinal sweep protuberance mounted on said end caps;

wherein each sweep protuberance protrudes a sufficient distance to graze the respective frame third piece baffle or frame fourth piece baffle to further seal against entry of light and airflow when said door is in a fully or partially closed position.

25. A vent door assembly described in immediately preceding claim 24, wherein:

(a) said door further comprises a guide channel extending along an interior accessible face from said third edge to said fourth edge, said channel adapted to coordinate with;

(b) a catch movable along said channel to a desired location and governing the length of a cord controlling the amount of opening of said door, said catch comprising a bolt having a head end captured within said channel and a threaded terminus defining a split along its axis and having a depth sufficient to accept said cord inserted therethrough; and (c) a retainer screw-cap for rotational mating with said threaded terminus to simultaneously fix the location of said bolt within said channel and fix the length of said cord.

* * * * *

UNITED STATES PATENT AND TRADEMARK OFFICE
CERTIFICATE OF CORRECTION

| | | |
|---|---|---|
| PATENT NO. | : 11,333,392 B1 | Page 1 of 1 |
| APPLICATION NO. | : 17/318449 | |
| DATED | : May 17, 2022 | |
| INVENTOR(S) | : Richard Kevin Eagan, Cliff Hufstedler and Christian Andre Sudbeck | |

It is certified that error appears in the above-identified patent and that said Letters Patent is hereby corrected as shown below:

On the Title Page

"(72) Inventors: Richard Kevin Eagan, Blackrock, AR"
SHOULD READ:
"(72) Inventors: Richard Kevin Eagan, Black Rock, AR"

Signed and Sealed this
Sixth Day of June, 2023

Katherine Kelly Vidal
*Director of the United States Patent and Trademark Office*